United States Patent [19]
Chrabaszcz

[11] Patent Number: 6,134,673
[45] Date of Patent: Oct. 17, 2000

[54] METHOD FOR CLUSTERING SOFTWARE APPLICATIONS

[75] Inventor: Michael Chrabaszcz, Milpitas, Calif.

[73] Assignee: Micron Electronics, Inc., Nampa, Id.

[21] Appl. No.: 08/942,318

[22] Filed: Oct. 1, 1997

Related U.S. Application Data

[60] Provisional application No. 60/046,327, May 13, 1997.

[51] Int. Cl.[7] .................................................. G06F 11/34
[52] U.S. Cl. .................................. 714/13; 4/3; 4/10; 4/11
[58] Field of Search ................................. 714/13, 10, 4, 714/3, 2, 17, 16, 20; 709/200, 201, 213

[56] References Cited

U.S. PATENT DOCUMENTS

| | | | |
|---|---|---|---|
| 4,057,847 | 11/1977 | Lowell et al. | 364/200 |
| 4,449,182 | 5/1984 | Rubinson et al. | 364/200 |
| 4,672,535 | 6/1987 | Katzman et al. | 364/200 |
| 4,692,918 | 9/1987 | Elliott et al. | 370/85 |
| 4,695,946 | 9/1987 | Andreasen et al. | 364/200 |
| 4,707,803 | 11/1987 | Anthony, Jr. et al. | |
| 4,769,764 | 9/1988 | Levanon | 364/708 |
| 4,774,502 | 9/1988 | Kimura | 340/501 |
| 4,835,737 | 5/1989 | Herrig et al. | |
| 4,949,245 | 8/1990 | Martin et al. | |
| 4,999,787 | 3/1991 | McNally et al. | |
| 5,006,961 | 4/1991 | Monico | |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,121,500 | 6/1992 | Arlington et al. | 395/750 |
| 5,136,708 | 8/1992 | Lapourtre et al. | |
| 5,138,619 | 8/1992 | Fasang et al. | 371/21.1 |
| 5,157,663 | 10/1992 | Major et al. | 371/9.1 |
| 5,210,855 | 5/1993 | Bartol | |
| 5,245,615 | 9/1993 | Treu | 371/16.5 |
| 5,247,683 | 9/1993 | Holmes et al. | 395/700 |
| 5,253,348 | 10/1993 | Scalise | 395/325 |
| 5,266,838 | 11/1993 | Gerner | 307/19 |
| 5,269,011 | 12/1993 | Yanai et al. | |
| 5,272,382 | 12/1993 | Heald et al. | 307/66 |
| 5,272,584 | 12/1993 | Austruy et al. | |
| 5,276,863 | 1/1994 | Heider | 395/575 |
| 5,280,621 | 1/1994 | Barnes et al. | 395/800 |
| 5,283,905 | 2/1994 | Saadeh et al. | 395/750 |
| 5,307,354 | 4/1994 | Cramer et al. | |
| 5,311,451 | 5/1994 | Barrett | 364/550 |
| 5,317,693 | 5/1994 | Cuenod et al. | |
| 5,329,625 | 7/1994 | Kannan et al. | |
| 5,337,413 | 8/1994 | Lui et al. | |
| 5,351,276 | 9/1994 | Doll, Jr. et al. | |

(List continued on next page.)

FOREIGN PATENT DOCUMENTS 0 866 403 A1  9/1998  European Pat. Off. .

OTHER PUBLICATIONS

Davis, T, Usenet post to alt.msdos.programmer, Apr. 1997, "Re: How do I create an FDISK batch file?"

Davis, T., Usenet post to alt.msdos.batch, Apr. 1997, "Re: Need help with automating FDISK and FORMAT . . . "

(List continued on next page.)

*Primary Examiner*—Ly V. Hua
*Attorney, Agent, or Firm*—Knobbe, Martens, Olson & Bear, LLP

[57] ABSTRACT

A method for fault tolerant execution of an application program, in a server network having a first and second server, wherein the method includes: executing the application program in the first server; storing an object which represents the program in a cluster network database, wherein the object contains information pertaining to the program; detecting a failure of the first server; and executing the application program in the second server upon detection of the failure of the first server, in accordance with the information in the object. The information may include: a host server attribute which identifies which server is currently executing the program; a primary server attribute which identifies which server is primarily responsible for executing the program; and a backup server attribute which identifies which server is a backup server for executing the program if the primary server experiences a failure.

64 Claims, 20 Drawing Sheets

U.S. PATENT DOCUMENTS

| | | | |
|---|---|---|---|
| 5,367,670 | 11/1994 | Ward et al. | 395/575 |
| 5,379,184 | 1/1995 | Barraza et al. | 361/685 |
| 5,386,567 | 1/1995 | Lien et al. . | |
| 5,388,267 | 2/1995 | Chan et al. | 395/700 |
| 5,402,431 | 3/1995 | Saadeh et al. | 371/67.1 |
| 5,404,494 | 4/1995 | Garney . | |
| 5,430,845 | 7/1995 | Rimmer et al. | 395/275 |
| 5,432,715 | 7/1995 | Shigematsu et al. | 364/551.01 |
| 5,432,946 | 7/1995 | Allard et al. | 395/750 |
| 5,438,678 | 8/1995 | Smith | 395/750 |
| 5,440,748 | 8/1995 | Sekine et al. . | |
| 5,455,933 | 10/1995 | Schieve et al. | 395/183.03 |
| 5,463,766 | 10/1995 | Schieve et al. | 395/650 |
| 5,473,499 | 12/1995 | Weir | 361/58 |
| 5,483,419 | 1/1996 | Kaczeus, Sr. et al. . | |
| 5,485,550 | 1/1996 | Dalton | 395/51 |
| 5,487,148 | 1/1996 | Komori et al. . | |
| 5,491,791 | 2/1996 | Glowny et al. . | |
| 5,493,574 | 2/1996 | McKinley . | |
| 5,493,666 | 2/1996 | Fitch . | |
| 5,513,314 | 4/1996 | Kandasamy et al. | 395/182.04 |
| 5,517,646 | 5/1996 | Piccirillo et al. . | |
| 5,526,289 | 6/1996 | Dinh et al. | 364/557 |
| 5,528,409 | 6/1996 | Cucci et al. | 359/171 |
| 5,533,198 | 7/1996 | Thorson . | |
| 5,535,326 | 7/1996 | Baskey et al. | 395/182.02 |
| 5,539,883 | 7/1996 | Allon et al. . | |
| 5,546,272 | 8/1996 | Moss et al. | 361/687 |
| 5,548,712 | 8/1996 | Larson et al. | 395/182.05 |
| 5,555,510 | 9/1996 | Verseput et al. . | |
| 5,559,764 | 9/1996 | Chen et al. | 396/30 |
| 5,559,958 | 9/1996 | Farrand et al. | 395/183.03 |
| 5,559,965 | 9/1996 | Ozlaskin et al. . | |
| 5,564,024 | 10/1996 | Pemberton . | |
| 5,566,339 | 10/1996 | Perholtz et al. | 395/750 |
| 5,568,610 | 10/1996 | Brown . | |
| 5,568,619 | 10/1996 | Blackledge et al. . | |
| 5,572,403 | 11/1996 | Mills | 361/695 |
| 5,577,205 | 11/1996 | Hwang et al. . | |
| 5,579,487 | 11/1996 | Meyerson et al. | 395/280 |
| 5,579,491 | 11/1996 | Jeffries et al. . | |
| 5,581,712 | 12/1996 | Herrman . | |
| 5,581,714 | 12/1996 | Amini et al. . | |
| 5,584,030 | 12/1996 | Husak et al. | 395/750 |
| 5,588,144 | 12/1996 | Inoue et al. . | |
| 5,592,610 | 1/1997 | Chittor . | |
| 5,596,711 | 1/1997 | Burckhartt et al. | 395/182.21 |
| 5,598,407 | 1/1997 | Bud et al. | 370/330 |
| 5,602,758 | 2/1997 | Lincoln et al. | 364/505 |
| 5,606,672 | 2/1997 | Wade . | |
| 5,608,876 | 3/1997 | Cohen et al. . | |
| 5,615,207 | 3/1997 | Gephardt et al. . | |
| 5,621,159 | 4/1997 | Brown et al. | 73/9 |
| 5,622,221 | 4/1997 | Genga, Jr. et al. | 165/208 |
| 5,625,238 | 4/1997 | Ady et al. | 307/147 |
| 5,627,962 | 5/1997 | Goodrum et al. | 395/182.11 |
| 5,630,076 | 5/1997 | Saulpaugh et al. | 395/284 |
| 5,631,847 | 5/1997 | Kikinis | 364/514 R |
| 5,632,021 | 5/1997 | Jennings et al. . | |
| 5,638,289 | 6/1997 | Yamada et al. . | |
| 5,644,470 | 7/1997 | Benedict et al. . | |
| 5,644,731 | 7/1997 | Liencres et al. . | |
| 5,651,006 | 7/1997 | Fujino et al. . | |
| 5,652,832 | 7/1997 | Kane et al. . | |
| 5,652,839 | 7/1997 | Giorgio et al. | 395/200.11 |
| 5,652,892 | 7/1997 | Ugajin | 395/750 |
| 5,652,908 | 7/1997 | Douglas et al. | 395/800 |
| 5,655,081 | 8/1997 | Bonnell et al. . | |
| 5,655,083 | 8/1997 | Bagley | 395/182.31 |
| 5,655,148 | 8/1997 | Richman et al. . | |
| 5,659,682 | 8/1997 | Devarakonda et al. . | |
| 5,664,118 | 9/1997 | Nishigaki et al. | 395/283 |
| 5,664,119 | 9/1997 | Jeffries et al. . | |
| 5,666,538 | 9/1997 | DeNicola . | |
| 5,668,992 | 9/1997 | Hammer et al. | 395/651 |
| 5,669,009 | 9/1997 | Buktenica et al. | 395/800.35 |
| 5,671,371 | 9/1997 | Kondo et al. | 395/306 |
| 5,675,723 | 10/1997 | Ekrot et al. . | |
| 5,680,288 | 10/1997 | Carey et al. . | |
| 5,684,671 | 11/1997 | Hobbs et al. . | |
| 5,689,637 | 11/1997 | Johnson et al. . | |
| 5,696,899 | 12/1997 | Kalwitz . | |
| 5,696,949 | 12/1997 | Young | 395/551 |
| 5,696,970 | 12/1997 | Sandage et al. . | |
| 5,704,031 | 12/1997 | Mikami et al. | 395/182.02 |
| 5,715,456 | 2/1998 | Bennett et al. | 395/652 |
| 5,724,529 | 3/1998 | Smith et al. . | |
| 5,726,506 | 3/1998 | Wood . | |
| 5,727,207 | 3/1998 | Gates et al. | 395/651 |
| 5,732,266 | 3/1998 | Moore et al. | 395/651 |
| 5,737,708 | 4/1998 | Grob et al. | 455/557 |
| 5,740,378 | 4/1998 | Rehl et al. . | |
| 5,742,514 | 4/1998 | Bonola | 364/492 |
| 5,742,833 | 4/1998 | Dea et al. | 395/750.05 |
| 5,747,889 | 5/1998 | Raynham et al. . | |
| 5,748,426 | 5/1998 | Bedingfield et al. . | |
| 5,752,164 | 5/1998 | Jones | 455/33.1 |
| 5,754,797 | 5/1998 | Takahashi . | |
| 5,758,165 | 5/1998 | Shuff | 395/712 |
| 5,758,352 | 5/1998 | Reynolds et al. | 707/200 |
| 5,761,033 | 6/1998 | Wilhelm . | |
| 5,761,045 | 6/1998 | Olson et al. . | |
| 5,761,085 | 6/1998 | Giorgio | 364/505 |
| 5,761,462 | 6/1998 | Neal et al. . | |
| 5,764,968 | 6/1998 | Ninomiya . | |
| 5,765,008 | 6/1998 | Desai et al. . | |
| 5,765,198 | 6/1998 | McCrocklin et al. . | |
| 5,767,844 | 6/1998 | Stoye | 345/212 |
| 5,768,541 | 6/1998 | Pan-Ratzlaff . | |
| 5,768,542 | 6/1998 | Enstrom et al. . | |
| 5,774,741 | 6/1998 | Choi . | |
| 5,777,897 | 7/1998 | Giorgio | 364/557 |
| 5,778,197 | 7/1998 | Dunham | 395/284 |
| 5,781,703 | 7/1998 | Desai et al. . | |
| 5,781,744 | 7/1998 | Johnson et al. | 395/283 |
| 5,781,767 | 7/1998 | Inoue et al. . | |
| 5,781,798 | 7/1998 | Beatty et al. . | |
| 5,784,555 | 7/1998 | Stone | 395/200.5 |
| 5,784,576 | 7/1998 | Guthrie et al. . | |
| 5,787,019 | 7/1998 | Knight et al. | 364/550 |
| 5,787,459 | 7/1998 | Stallmo et al. | 711/112 |
| 5,787,491 | 7/1998 | MerKin et al. | 711/173 |
| 5,790,775 | 8/1998 | Marks et al. | 395/182.07 |
| 5,790,831 | 8/1998 | Lin et al. . | |
| 5,793,987 | 8/1998 | Quackenbush et al. . | |
| 5,794,035 | 8/1998 | Golub et al. . | |
| 5,796,185 | 8/1998 | Takata et al. . | |
| 5,796,580 | 8/1998 | Komatsu et al. | 361/687 |
| 5,796,981 | 8/1998 | Abudayyeh et al. . | |
| 5,797,023 | 8/1998 | Berman et al. | 395/750.06 |
| 5,798,828 | 8/1998 | Thomas et al. . | |
| 5,799,036 | 8/1998 | Staples . | |
| 5,799,196 | 8/1998 | Flannery | 395/750.03 |
| 5,801,921 | 9/1998 | Miller . | |
| 5,802,269 | 9/1998 | Poisner et al. . | |
| 5,802,298 | 9/1998 | Imai et al. . | |
| 5,802,305 | 9/1998 | McKaughan et al. | 395/200.57 |
| 5,802,324 | 9/1998 | Wunderlich et al. | 395/281 |
| 5,802,393 | 9/1998 | Begun et al. . | |
| 5,802,552 | 9/1998 | Fandrich et al. . | |
| 5,802,592 | 9/1998 | Chess et al. | 711/164 |
| 5,803,357 | 9/1998 | Lakin | 236/78 B |

| | | |
|---|---|---|
| 5,805,834 | 9/1998 | McKinley et al. . |
| 5,809,224 | 9/1998 | Schultz et al. . |
| 5,809,287 | 9/1998 | Stupek, Jr. et al. ............. 395/500 |
| 5,809,311 | 9/1998 | Jones ........................... 395/750.01 |
| 5,812,748 | 9/1998 | Ohran et al. ................... 395/182.02 |
| 5,812,750 | 9/1998 | Dev et al. . |
| 5,812,757 | 9/1998 | Okamoto et al. . |
| 5,812,858 | 9/1998 | Nookala et al. . |
| 5,815,117 | 9/1998 | Kolanek . |
| 5,815,647 | 9/1998 | Buckland et al. ............... 395/182.01 |
| 5,815,652 | 9/1998 | Ote et al. . |
| 5,821,596 | 10/1998 | Miu et al. ....................... 257/419 |
| 5,822,547 | 10/1998 | Boesch et al. . |
| 5,835,719 | 11/1998 | Gibson et al. .................. 395/200.51 |
| 5,835,738 | 11/1998 | Blackledge, Jr. et al. . |
| 5,838,932 | 11/1998 | Alzien ........................... 395/308 |
| 5,841,991 | 11/1998 | Russell . |
| 5,852,720 | 12/1998 | Gready et al. . |
| 5,852,724 | 12/1998 | Glenn et al. . |
| 5,857,074 | 1/1999 | Johnson . |
| 5,857,102 | 1/1999 | McChesney et al. . |
| 5,864,653 | 1/1999 | Tavallaei et al. ............... 315/181 |
| 5,867,730 | 2/1999 | Leyda ............................ 395/830 |
| 5,875,307 | 2/1999 | Ma et al. ........................ 395/281 |
| 5,875,310 | 2/1999 | Buckland et al. ............... 395/306 |
| 5,878,237 | 3/1999 | Olarig ........................... 395/308 |
| 5,878,238 | 3/1999 | Gan et al. ....................... 395/308 |
| 5,881,311 | 3/1999 | Woods ........................... 395/824 |
| 5,884,027 | 3/1999 | Garbus et al. .................. 395/200.8 |
| 5,889,965 | 3/1999 | Wallach et al. ................. 395/283 |
| 5,892,928 | 4/1999 | Wallach et al. ................. 395/283 |
| 5,898,888 | 4/1999 | Guthrie et al. .................. 395/308 |
| 5,905,867 | 5/1999 | Giorgio ........................... 395/200.54 |
| 5,907,672 | 5/1999 | Matze et al. .................... 395/182.06 |
| 5,913,034 | 6/1999 | Malcolm ........................ 395/200.53 |
| 5,922,060 | 7/1999 | Goodrum ....................... 710/103 |
| 5,936,960 | 8/1999 | Stewart .......................... 370/438 |

OTHER PUBLICATIONS

NetFrame Systems Incorporated, Doc. No. 78–1000226–01, pp. 1–2, 5–8, 359–404, and 471–512, Apr. 1996, "NetFrame Clustered Multiprocessing Software: NW0496 DC–ROM for Novell® NetWare® 4.1 SMP, 4.1, and 3.12."

Shanley, and Anderson, PCI System Architecture, Third Edition, Chapter 15, pp. 297–302, Copyright 1995, "Intro To Configuration Address Spaces."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

Shanley and Anderson, PCI System Architecture, Third Editon, Chapters 15 & 16, pp. 297–328, CR 1995.

PCI Hot–Plug Specification, Preliminary Revision for Review Only, Revision 0.9, pp. i–vi, and 1–25, Mar. 5, 1997.

SES SCSI–3 Enclosure Services, X3T10/Project 1212–D/ Rev 8a, pp. i, iii–x, 1–76, and 1–1 (index), Jan. 16, 1997.

Compaq Computer Corporation, Technology Brief, pp. 1–13, Dec. 1996, "Where Do I Plug the Cable? Solving the Logical–Physical Slot Numbering Problem."

NF450FT Network Mainframe.

NetFRAME News Release "NetFRAMES's New High–Availability ClusterServer Systems Avoid Scheduled as well as Unscheduled Downtime."

NetFRAME ClusterServer.

| TAG | CA-1 |
|---|---|
| TYPE | CLUSTER CAPABLE |
| COMMAND | D |
| HOST SERVER | 102 |
| PRIMARY SERVER | 102 |
| BACKUP SERVER | 104 |
| RESOURCE LIST | D |

110 ← 410

| TAG | |
|---|---|
| TYPE | |
| COMMAND | |
| HOST SERVER | |
| PRIMARY SERVER | |
| BACKUP SERVER | |
| RESOURCE LIST | |

| | |
|---|---|
| TAG | CA-1 |
| TYPE | CLUSTER CAPABLE |
| COMMAND | D |
| HOST SERVER | 104 |
| PRIMARY SERVER | 102 |
| BACKUP SERVER | 104 |
| RESOURCE LIST | D |

410

| | |
|---|---|
| TAG | CA-1 |
| TYPE | CLUSTER CAPABLE |
| COMMAND | D |
| HOST SERVER | 104 |
| PRIMARY SERVER | 102 |
| BACKUP SERVER | 104 |
| RESOURCE LIST | D |

| TAG | CA-1 |
|---|---|
| TYPE | CLUSTER CAPABLE |
| COMMAND | D |
| HOST SERVER | 102 |
| PRIMARY SERVER | 102 |
| BACKUP SERVER | 104 |
| RESOURCE LIST | D |

410

| TAG | CA-1 |
|---|---|
| TYPE | CLUSTER CAPABLE |
| COMMAND | D |
| HOST SERVER | 104 |
| PRIMARY SERVER | 102 |
| BACKUP SERVER | 104 |
| RESOURCE LIST | D |

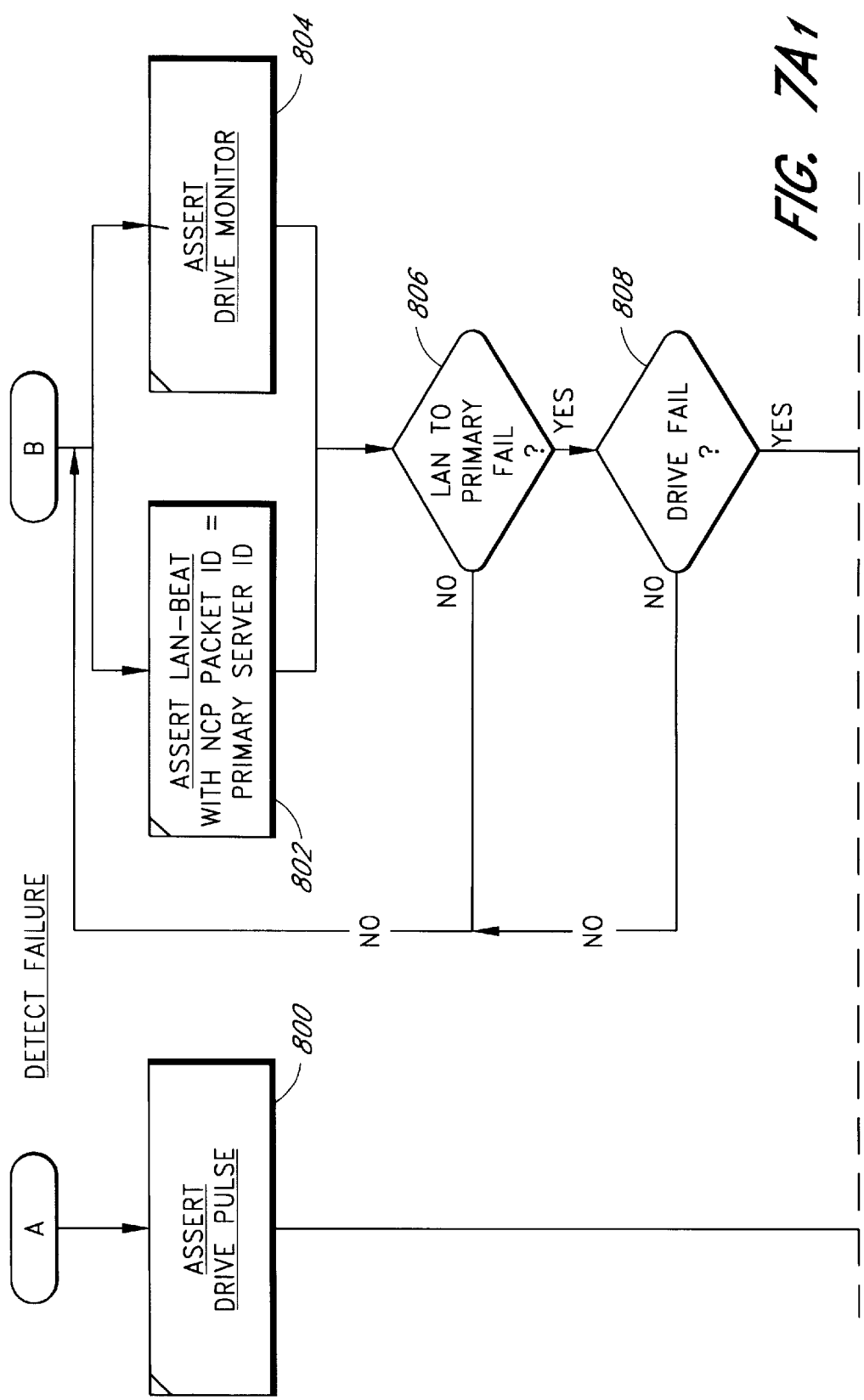
FIG. 7A1

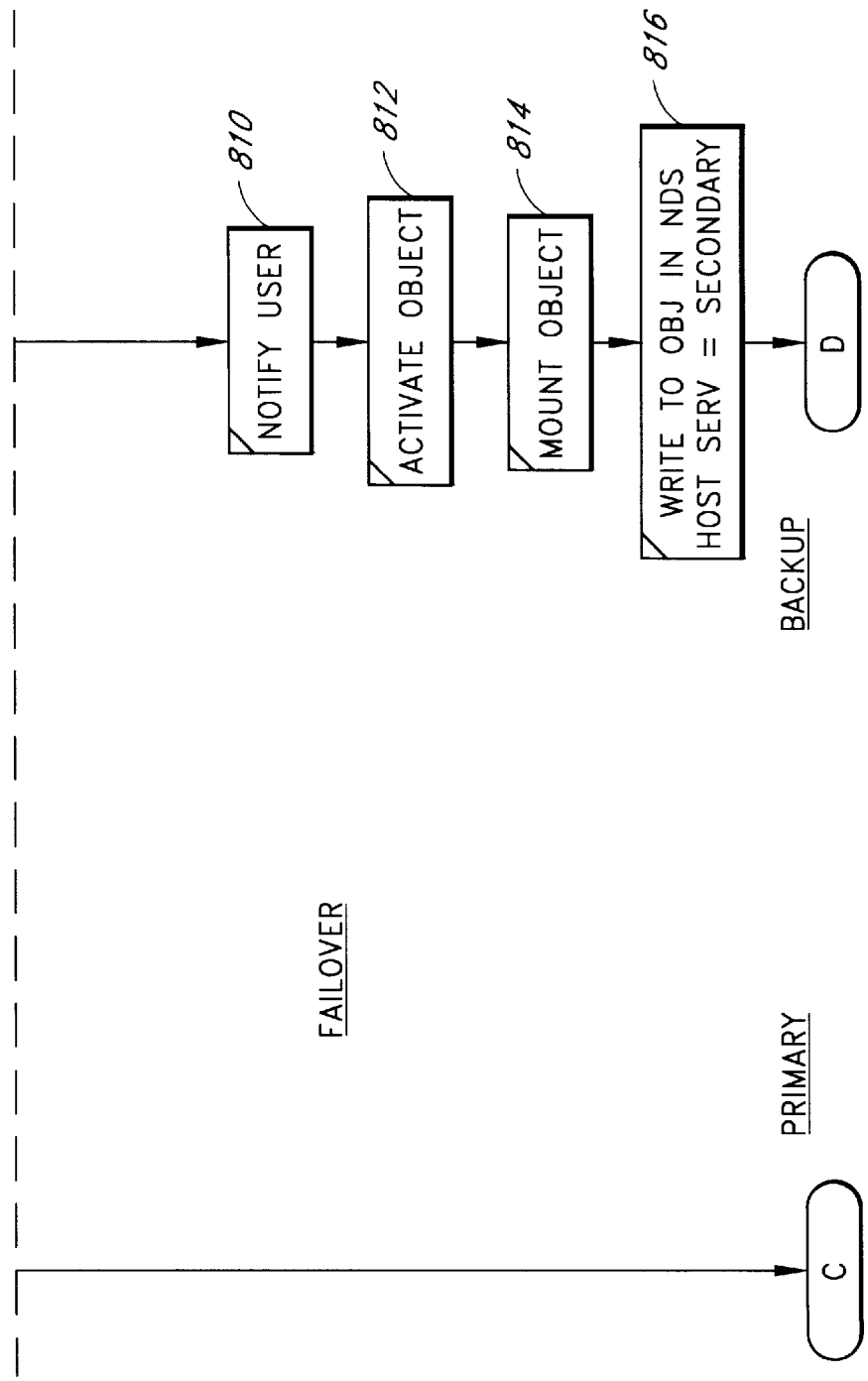
FIG. 7A2

METHOD FOR CLUSTERING SOFTWARE APPLICATIONS

RELATED APPLICATIONS

This application is related to U.S. patent application Ser. No. 08/942,411 entitled, "System for Clustering Software Applications," which is commonly owned and filed concurrently herewith.

PRIORITY CLAIM

The benefit under 35 U.S.C. § 119(e) of the following U.S. provisional application(s) is hereby claimed:

| Title | Application No. | Filing Date |
|---|---|---|
| "Clustering of Computer Systems Using Uniform Object Naming and Distributed Softare for Locating Objects" | 60/046,327 | May 13, 1997 |

APPENDICES

Appendix A, which forms a part of this disclosure, is a list of commonly owned copending U.S. patent applications. Each one of the applications listed in Appendix A is hereby incorporated herein in its entirety by reference thereto.

Appendix B, which forms part of this disclosure, is a copy of the U.S. provisional patent application filed May 13, 1997, entitled "Clustering of Computer Systems Using Uniform Object Naming and Distributed Sotware For Locating Objects" and assigned Application No. 60/046,327. Page 1, line 7 of the provisional application has been changed from the original to positively recite that the entire provisional application, including the attached documents, forms part of this disclosure.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to fault tolerant computer systems. More particularly, the invention relates to providing fault tolerant execution of application programs in a server network, by providing a method and system for executing an application program in a backup server if it is determined that a primary server, which normally executes the program, has failed.

2. Description of the Related Technology

As computer systems and networks become more complex and capital intensive, system failures which result in lost data and/or inaccessible applications have become unacceptable. In the computer industry, the reduction of computer failures and computer "downtime" is a major focus for companies trying to achieve a competitive edge over their competitors. The reduction of downtime due to system failures and maintenance is critical to providing quality performance and product reliability to the users and buyers of computer systems. Particularly with respect to server computers which are accessed and utilized by many end users, the reduction of server downtime is an extremely desirable performance characteristic. This is especially true for users who depend on the server to obtain data and information in their daily business operations.

As servers become more powerful, they are also becoming more sophisticated and complex. A server is typically a central computer in a computer network which manages common data and application programs that may be accessed by other computers, otherwise known as "workstations," in the network. Server downtime, resulting from hardware or software faults or from repair and maintenance, continues to be a significant problem today. By one estimate, the cost of downtime in mission critical environments has risen to an annual total of $4.0 billion for U.S. businesses, with the average downtime event resulting in a $140 thousand loss in the retail industry and a $450 thousand loss in the securities industry. It has been reported that companies lose as much as $250 thousand in employee productivity for every 1% of computer downtime. With emerging internet, intranet and collaborative applications taking on more essential business roles every day, the cost of network server downtime will continue to spiral upward.

Various systems for promoting fault tolerance have been devised. To prevent network down time due to power failure, uninterruptible power supplies (UPS) are commonly used. Basically a rechargeable battery, a UPS provides insurance that a workstation or server will survive during even extended periods of power failures.

To prevent network downtime due to failure of a storage device, data mirroring was developed. Data mirroring provides for the storage of data on separate physical devices operating in parallel with respect to a file server. Duplicate data is stored on separate drives. Thus, when a single drive fails the data on the mirrored drive may still be accessed.

To prevent network downtime due to a failure of a print/file server, server mirroring has been developed. Server mirroring as it is currently implemented requires a primary server and storage device, a backup server and storage device, and a unified operating system linking the two. An example of a mirrored server product is the Software Fault Tolerance level 3 (SFT III) product by Novell Inc., 1555 North Technology Way, Orem, Utah, as an add-on to its NetWare®4.x product. SFT III maintains servers in an identical state of data update. It separates hardware-related operating system (OS) functions on the mirrored servers so that a fault on one hardware platform does not affect the other. The server OS is designed to work in tandem with two servers. One server is designated as a primary server, and the other is a secondary server. The primary server is the main point of update; the secondary server is in a constant state of readiness to take over. Both servers receive all updates through a special link called a mirrored server link (MSL), which is dedicated to this purpose. The servers also communicate over the local area network (LAN) that they share in common, so that one knows if the other has failed even if the MSL has failed. When a failure occurs, the second server automatically takes over without interrupting communications in any user-detectable way. Each server monitors the other server's NetWare Core Protocol (NCP) acknowledgments over the LAN to see that all the requests are serviced and that OSs are constantly maintained in a mirrored state.

When the primary server fails, the secondary server detects the failure and immediately takes over as the primary server. The failure is detected in one or both of two ways: the MSL link generates an error condition when no activity is noticed, or the servers communicate over the LAN, each one monitoring the other's NCP acknowledgment. The primary server is simply the first server of the pair that is brought up. It then becomes the server used at all times and it processes all requests. When the primary server fails, the secondary server is immediately substituted as the primary server with identical configurations. The switch-over is handled entirely at the server end, and work continues without any perceivable interruption.

Power supply backup, data mirroring, and server mirroring all increase security against down time caused by a failed hardware component, but they all do so at considerable cost. Each of these schemes requires the additional expense and complexity of standby hardware, that is not used unless there is a failure in the network. Mirroring, while providing redundancy to allow recovery from failure, does not allow the redundant hardware to be used to improve cost/performance of the network.

What is needed is a fault tolerant system for computer networks that can provide all the functionality of UPS, disk mirroring, or server mirroring without the added cost and complexity of standby/additional hardware. What is needed is a fault tolerant system for computer networks which smoothly interfaces with existing network systems. Additionally, what is needed is a method or system of clustering application software programs which may be executed by servers within the network. There is a need to provide a clustering capability in which a software application being executed on a first server may be "backed-up", e.g., clustered, such that a second server may continue execution of the application if for some reason the first server fails.

SUMMARY OF THE INVENTION

The invention addresses the above and other needs by providing a method and system for clustering software application programs which are executable by one or more servers in a server network.

In one embodiment of the invention, a method for fault tolerant execution of an application program in a server network having a first and second server, includes: executing the application program in the first server; storing an object which represents the program in a cluster network database, wherein the object contains information pertaining to the program; detecting a failure of the first server; and executing the application program in the second server upon detection of the failure of the first server, in accordance with said information in said object.

In another embodiment, a method for fault tolerant execution of an application program in a server network having a first and second server, includes the acts of: executing the application program in the first server; prompting a system operator for information to be stored in a cluster network database, wherein the information comprises: a host server attribute which identifies which server is currently executing the program; a primary server attribute which identifies which server is primarily responsible for executing the program; and a backup server attribute which identifies which server is a backup server for executing the program if the primary server experiences a failure; determining if the first server has failed; if it is determined that the first server has failed, initiating a failover procedure, comprising: reading the backup server attribute in the object with the second server; determining whether the backup server attribute names the second server as the backup server; if the backup server status names the second server as the backup server, loading the program in the second server determining if the first server is once again operational; and if it is determined that the first server is once again operational, initiating a failback process, comprising: unloading the program from a random access memory in the second server; verifying that the program has been unloaded from the second server; and loading the program in a random access memory in the first server after the program has been unloaded from the second server.

In another embodiment, a method of registering a software program in a cluster network database, coupled to a first server and a second server in a server network, includes: determining if the program was previously registered; if it is determined that the program was not previously registered, creating an object for the program and storing the object in the database; if it is determined that the program was previously registered, determining if a system operator previously unloaded the program; if it is determined that the system operator previously unloaded the program, changing a host server attribute within an object corresponding to tje program to indicate that the first server is the host server of the program; if it is determined that the system operator did not previously unload the program, determining if the first server is coming back from a failback process; and if it is determined that the first server is not coming back from the failback process, synchronizing all replicated databases within the network.

In yet a further embodiment, a method for fault tolerant execution of an application program in a server network having a first and second server, includes: executing the application program in the first server; storing an object which represents the program in a cluster network database, wherein the object contains information pertaining to the program; detecting a failure of the first server; reading the information contained in the object; and executing the application program in the second server upon detection of the failure of the first server, in accordance with the information in the object.

In another embodiment, a method of providing fault tolerant execution of an application program in a server network having a first and second server, includes: executing said application program in said first server; detecting a failure of said first server to properly run said application; and automatically, without operator intervention, executing said application program in said second server in response to said detecting step.

In a further embodiment, a method of providing fault tolerant execution of an application program in a server network having a first and second server, includes: executing said application program in said first server; detecting a fault in the first server; and automatically, without operator intervention, executing said application program in said second server in response to said detecting step.

BRIEF DESCRIPTION OF THE DRAWINGS

FIGS. 4A–4H illustrate functional diagrams which show various states of objects stored in two replicated network directory databases, wherein the objects represent a clustered application during a detect, failover and failback process, in accordance with one embodiment of the invention.

FIG. 7A illustrates a flowchart for one embodiment of a process of failure detection and failover, in accordance with the invention.

DETAILED DESCRIPTION OF THE INVENTION

The invention is described in detail below with reference to the figures, wherein like elements are referenced with like numerals throughout. It is understood that the embodiments described below are merely illustrative of the invention and should not be construed to limit the scope of the invention as indicated by the appended claims.

In one embodiment, the invention involves an enhanced network directory database which operates in conjunction with server resident processes, i.e., Netframe Cluster software, to remap the execution of clustered applications, or clustered programs, in the event of a server failure. In one embodiment, the enhanced network directory database is replicated throughout all servers of the network. As explained in further detail below, the database stores configuration data ("objects") which contain for each clustered application, a primary and a secondary server affiliation as well as other information. Initially, all users access a clustered application through the server identified in the object as being the primary server for that clustered application.

When server resident processes, otherwise known as Netframe Cluster software, detect a failure of the primary server, the enhanced database is updated to reflect the failure of the primary server, and to change the affiliation of the clustered application from its primary to its secondary, or backup, server. In one embodiment, the updating and remapping are accomplished by server resident processes which detect a failure of the primary server, and remap the clustered application server affiliation. This remapping occurs transparently to whichever user is accessing the clustered application. Thus, all users access a clustered application through the backup server. This process may be reversed when the primary server resumes operation, the backup server unloads the clustered application from memory, and then users may again access the clustered application through the primary server, thereby regaining fault tolerance, i.e. backup, capability.

No dedicated redundant resources are required to implement the current invention. Rather, the current invention allows server resident processes to intelligently relocate cluster applications to servers in the event of server failure. A server may be a primary server with respect to a clustered application loaded in its memory, a secondary or backup server with respect to another clustered application stored in its hard drive, though not loaded in memory, and function as a fully functional file server.

Figure 1:
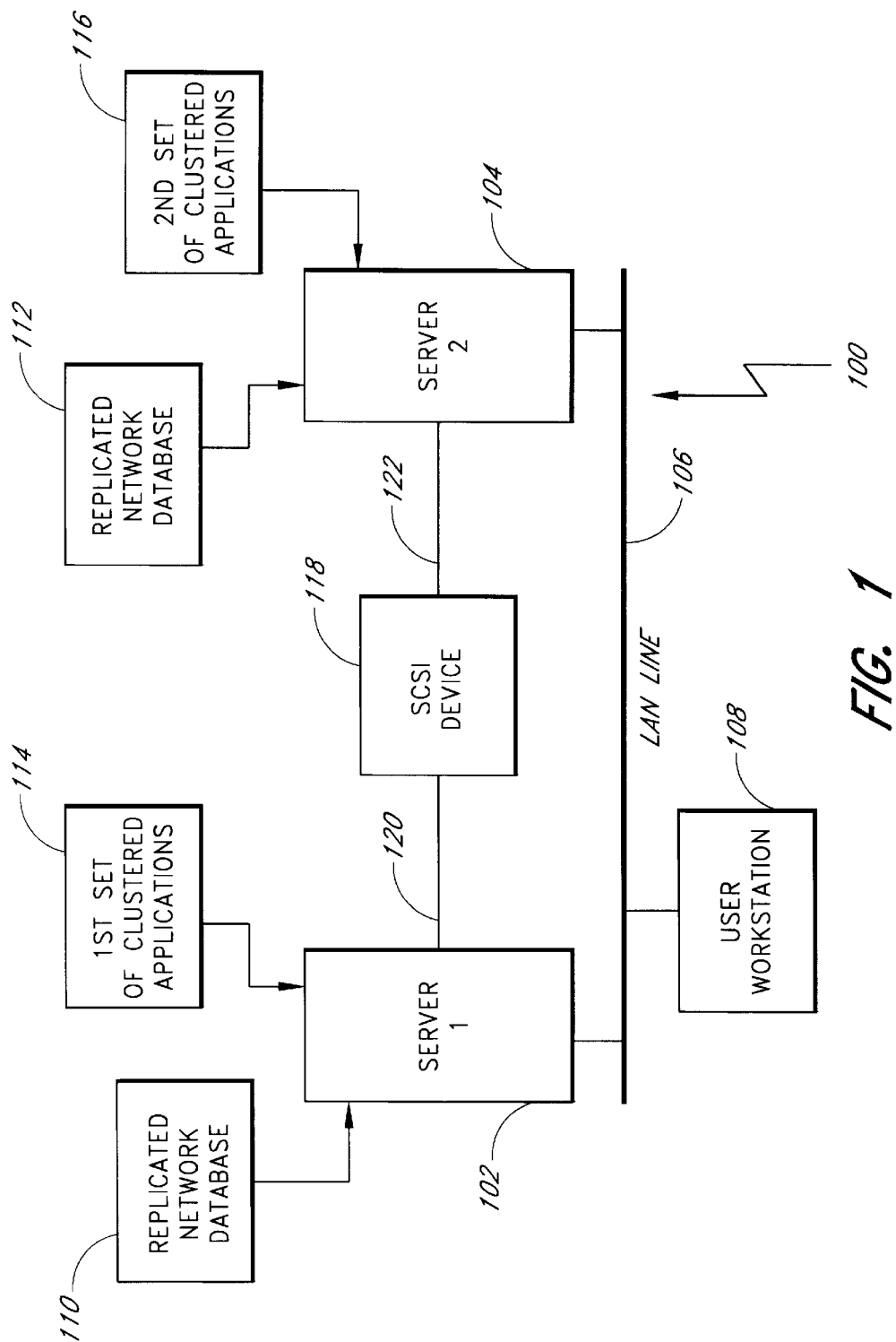
FIG. 1 is a block diagram of one embodiment of a clustered application server network in accordance with the invention.

Referring to FIG. 1, one embodiment of a clustered application server network 100, in accordance with the invention is illustrated. The network 100 includes a first fileserver computer 102 (server 102) and a second fileserver computer 104 (server 104), both connected to a local area network (LAN) line 106. A user or client may access either of the servers 102 or 104 by means of a user workstation 108 also connected to the LAN line 106. The network 100 also includes a first replicated network database 110, coupled to or contained within the first server 102, and a second replicated database 112, coupled to or contained within the second server 104. Each replicated database 110 and 112 contain the exact same information as the other (hence "replicated") so as to serve as a common "information control center" for the various processes involved in clustering data and application programs, as described in further detail below. In one embodiment, the network may include a single network data base 110, for example, which is coupled with the servers 102 and 104. Also, in one embodiment, each replicated network directory database 110 and 112 may be a part of a NetWare Directory Services (NDS) architecture, which is provided in Novell's NetWare 4.x product. However, the replicated network directory database is not limited to Netware database architectures and other network operating systems may be utilized by the invention. The format and functioning of the databases 110 and 112 is described in greater detail below with reference to FIG. 2.

The information contained within each database 110 and 112 includes objects which each represent a corresponding application program stored within the first server 102 and the second server 104, as well as other information. As explained in further detail below with reference to FIG. 2, each object contains records, or attributes, relating to its corresponding program. As shown in FIG. 1, a first set of application programs 114 is stored within a hard drive (not shown) of the first server 102. A second set of application programs 116 is stored within a hard drive (not shown), typically the C:\drive, of the second server 104. These applications are executable in their respective servers 102 and 104 by loading them into the random access memory (RAM) space of its respective server 102 and 104. As also explained in further detail below, each program is assigned a primary server, which is normally responsible for its execution, and a backup server, which is responsible for its execution if the primary server goes down (i.e., fails).

The network 100 further includes a small computer system interface (SCSI) device 118 which is coupled to the first server 102 via a first SCSI bus 120, and coupled to the second server 104 via a second SCSI bus 122. As explained in further detail below, in one embodiment, the SCSI device 118, the first SCSI bus 120 and the second SCSI bus 122, are utilized by the server network 100 in order to provide a method and system for detecting the operational status of one server by the other.

Figure 2:
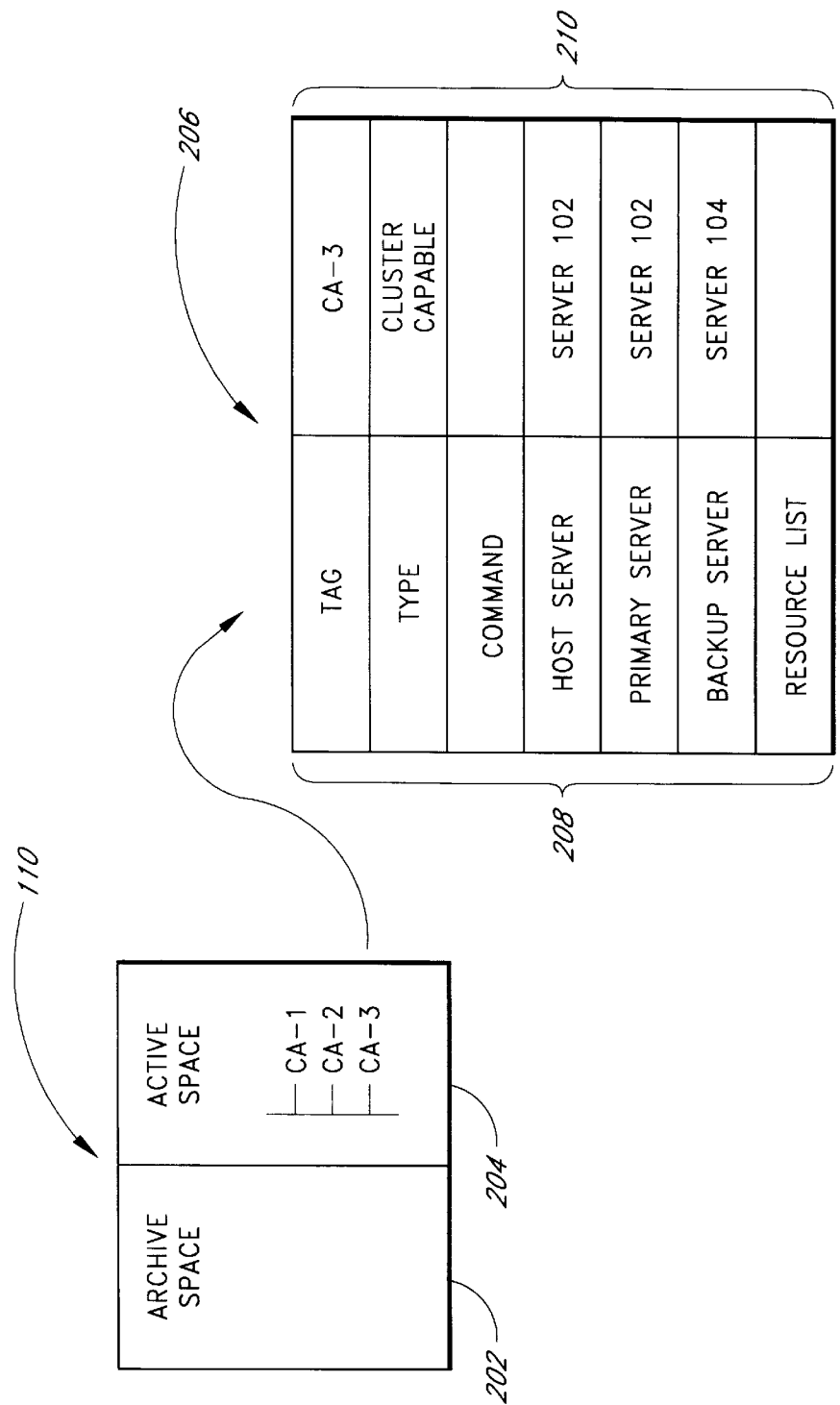
FIG. 2 is a functional block diagram of one embodiment of a replicated database and object which is stored in the database which may be used in the network of FIG. 1 in accordance with the invention.

FIG. 2 provides a functional block diagram of the first replicated network directory database 110 of FIG. 1 and an object 206 which is stored in the database 110. It is understood that the second replicated database 112 is identical to the first database 110. An update to one database will result in the replication of the update in the other database. The databases 110 and 112 are updated, for example, when a clustered application is loaded or unloaded in a server or when server affiliations are changed. The database 110 also contains an active memory space which contains objects of all application programs currently being executed by the first server 102. As shown in FIG. 2, these objects include CA-1, CA-2 and CA-3. A functional diagram of the object 206 for cluster application CA-3 is also illustrated. The object 206 located in the active space 204 represents a clustered application CA-3, loaded in the random access memory (RAM) of the first server 102. An application loaded in RAM, for purposes of describing the invention herein, is assumed to be executing unless otherwise specified.

The object 206 has specific object attributes 208 and attribute values 210. As defined by the network cluster software, in one embodiment, a clustered application object has the following attributes: TAG, TYPE, COMMAND, HOST SERVER, PRIMARY SERVER, BACKUP SERVER, and RESOURCE LIST. TAG is an identifier such as CA-3. Each clustered application has a different tag to distinguish itself. TYPE refers to whether the clustered application is cluster capable or cluster aware. COMMAND refers to the command line parameters which control loading and executing of a clustered application. The HOST SERVER is where the clustered application is currently loaded in memory. The PRIMARY SERVER is where the clustered application is normally loaded. The BACKUP SERVER is where the clustered application is loaded after the primary server fails. The RESOURCE LIST is a list of hardware and software resources required by the cluster application.

Cluster Capable and Cluster Aware Applications

Applications can be categorized three ways: cluster capable, cluster aware, and unclusterable. There are two types of applications that network clustering software such as Netframe Cluster software may accommodate. They are cluster capable and cluster aware applications. Cluster capable applications are applications that may be clustered, but typically may not take advantage of the special network cluster software functionality and features. Cluster aware applications are applications that not only may be clustered, but may also take full advantage of the special network cluster software and architecture. As such, cluster aware applications in a network cluster software environment, e.g. Netframe Cluster, are more programmable and efficient in implementing its tasks.

In order to take advantage of network cluster software, the application usually must be clusterable, that is, it is usually at least cluster capable. Cluster capable applications typically satisfy three criteria: location independence, cache memory independence, and recoverability.

An application is location independent if a replacement instance of the application can be run on more than one server. An application is usually not location independent if the physical address of the server cannot be reassigned or packets cannot be rerouted. Therefore, an application that hard codes itself to a specific IP address is typically not location independent. If an application is location independent, then once a file server fails, all other servers and all clients may communicate with the backup server to run that application. If the application cannot be loaded and run on a backup server then it is usually not location independent, and thus usually not cluster capable.

The application should also typically be independent or substantially independent from the file server cache memory. Currently, it is difficult to recover lost data from the cache memory after a failure. Any files not written to the disk, or any state information of the application in memory, is usually lost. Therefore, a cluster application should be tolerant to this data loss when the application recovers. If the loss of information in memory is an acceptable cost when weighing the advantages of clustering, then this prong of the test may be satisfied.

The application should preferably be recoverable. Most databases and well written electronic mail systems are recoverable. Recoverable applications may back out of an incomplete task and self-terminate. This allows the application to be loaded in another server within the network without creating conflicts in which two copies of the application are running on two separate servers.

If all three criteria of location independence, cache memory independence, and recoverability are met then the application is cluster capable and may be clustered. Cluster capable applications are typically commercially available programs which meet the above criteria but which were not written specifically with clustering in mind. However, some applications are specifically written with network cluster software in mind. These applications are cluster aware applications.

In order for an application to be cluster aware, it is usually written to take advantage of the network cluster software and architecture. A cluster aware application takes advantage of supporting utilities that are available through an application programming interface (API) of the cluster software. These utilities may be sets of functions called by the cluster aware application that insure a smooth transition between the primary server and the backup during failover and failback, for example, intercommunication between the network cluster software and the cluster application may be utilized to minimize transition delays and provide additional functionality as described in further detail below.

FIGS. 3A–D illustrate functional block diagrams showing the various states of a first server 102 and a second server 104 during a sequence of detection, failover and failback events. Although a clustered application can be loaded on any of the servers of a network system, the present disclosure assumes that a clustered application is affiliated with server 102 as its primary server. Workstations 302 and 304 are running client software of the clustered application through the primary server 102 as indicated by communication path 312. Therefore, server 102 is the host and primary server of the application. Server 104 is assigned as the backup or secondary server. The object values of these attributes are updated in the database 110 and 112 if any of these assignments are changed. Both servers 102 and 104 have a copy of the cluster application stored in their hard drives. Both servers 102 and 104 have Netframe Cluster software loaded to execute resident server processes 306 and 308, respectively. Servers 102 and 104 each contain identical databases, 110 and 112, respectively. Server 102 runs process 306 for detection, failover and failback. Server 104 runs process 308 for detection, failover and failback.

Figure 3A:
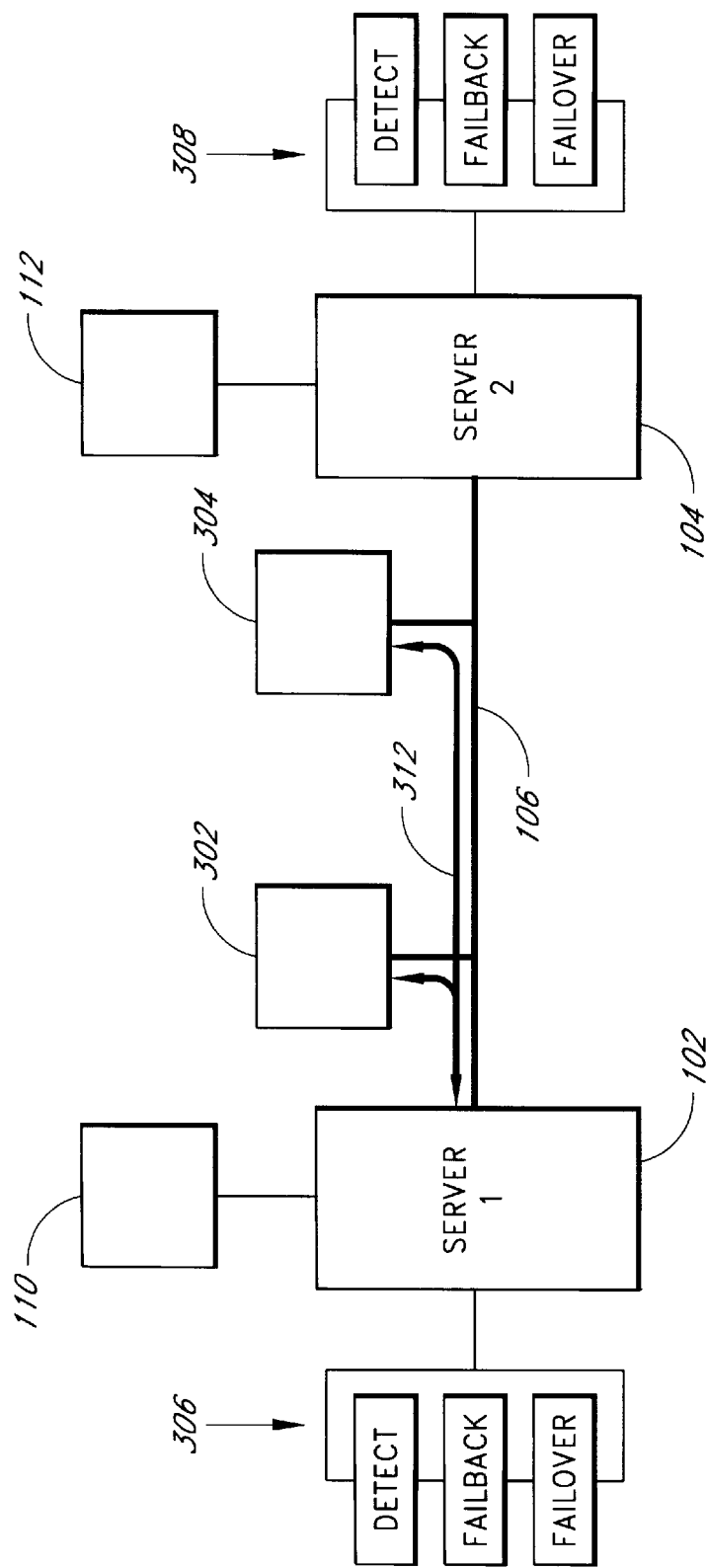
FIGS. 3A–3D illustrate hardware block diagrams showing various states of the network hardware during a detect, failover and failback operation in accordance with one embodiment of the invention.
Figure 3B:
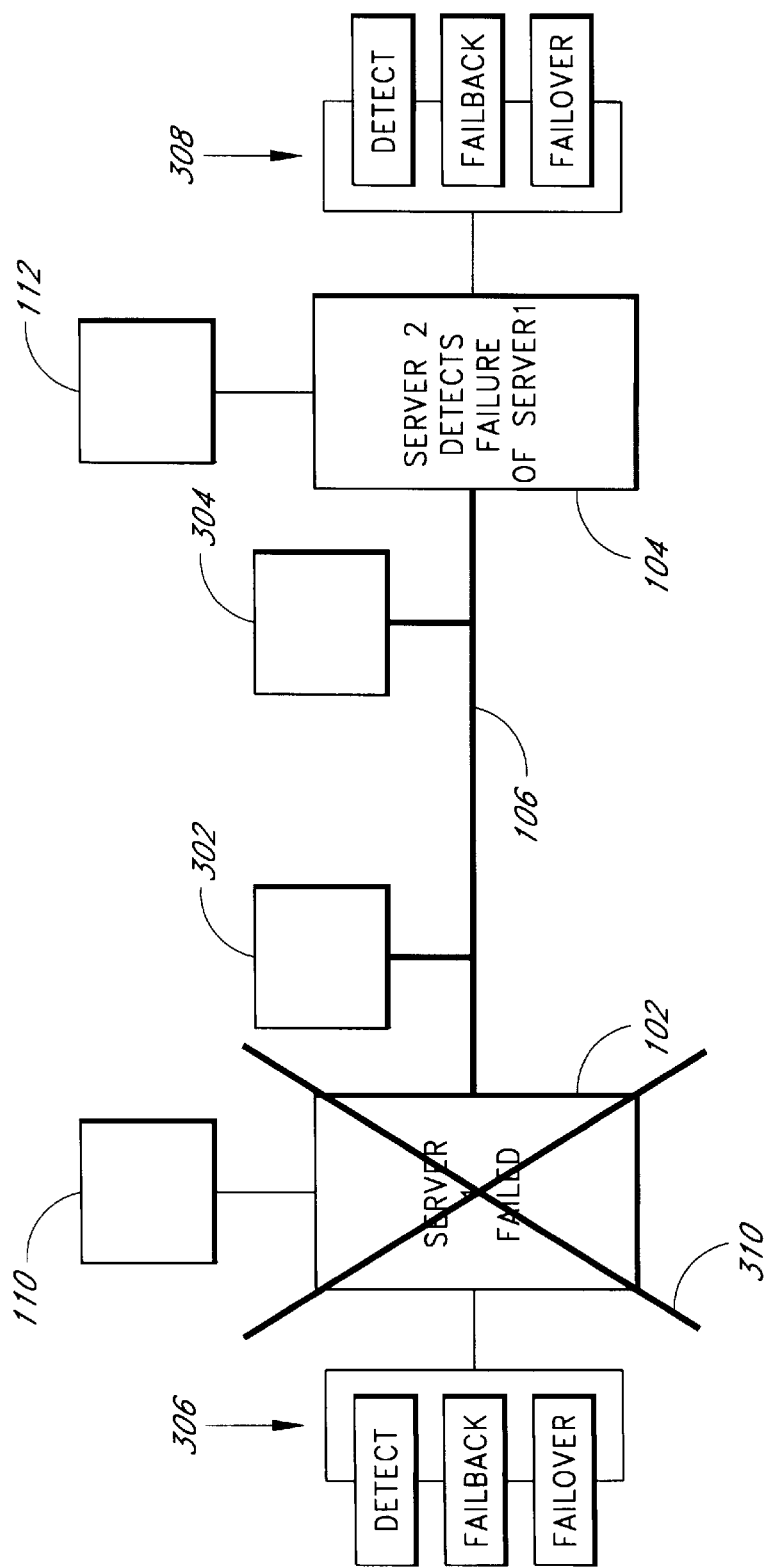

FIG. 3B shows an instance in which the primary server 102 has failed, as indicated by the termination mark 310. Communications between server 102 and workstations 302 and 304 are terminated.

Figure 3C:
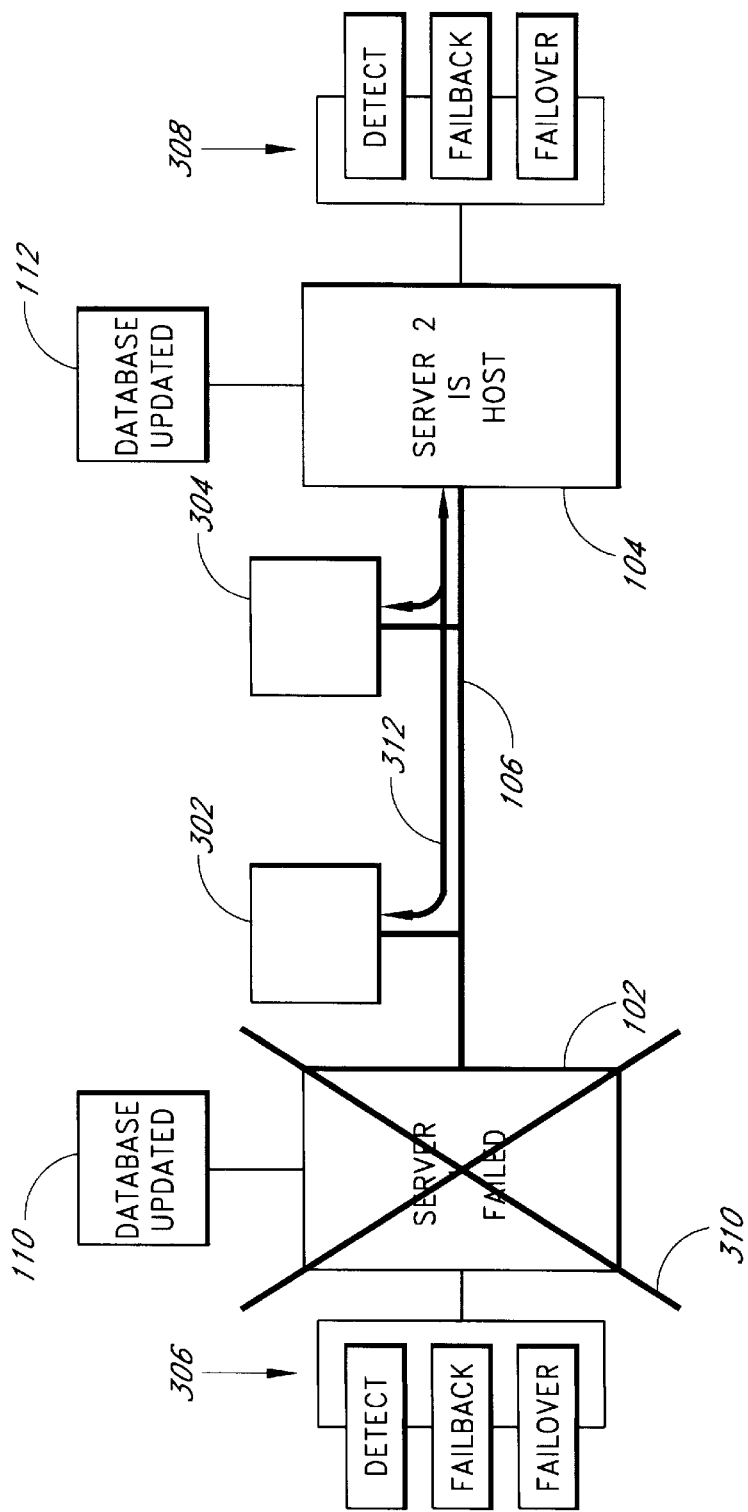

In FIG. 3C, the process 308 running on the second server 104 has detected the failure of the first server 102. As described above, the clustered application that is loaded into the RAM of the first server 102 is represented in the databases 110 and 112 by an object. Since the object contained in databases 110 and 112 designates the second server 104 as the backup server, the second server 104 will load its own copy of the clustered application from its hard drive and execute the clustered application upon detection of the primary server failure. Upon detection of the failure of a server, the Netframe Cluster software updates the database 112. The object in the databases is updated such that the value of the host server attribute is changed to the second server 104, the backup server. Because the attribute values in the object for the cluster application have been changed, communications with the clustered application will now be rerouted through server 104. This process is referred to as the failover process herein.

Figure 3D:
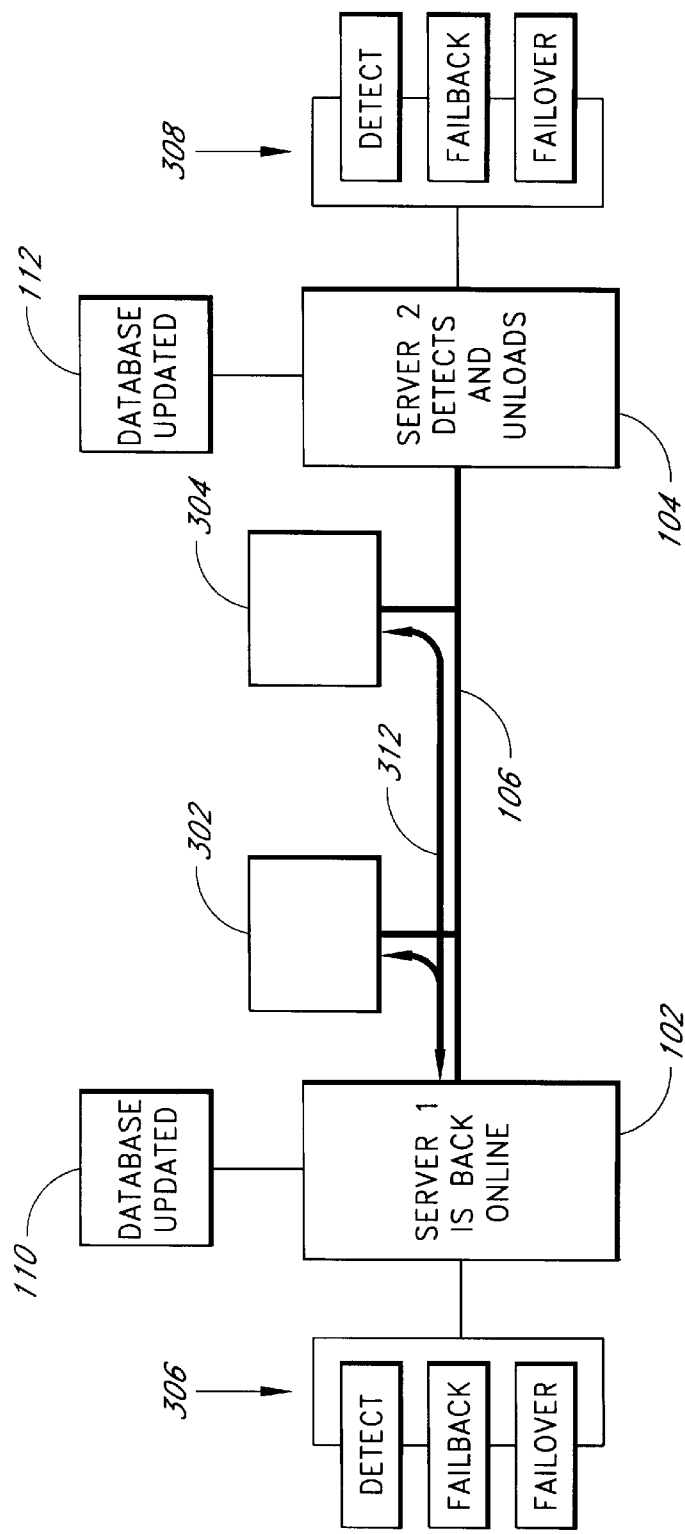

FIG. 3D indicates that the first server 102 has resumed normal operation. From here, the next act depends upon whether the clustered application is cluster capable or cluster aware.

If the application is cluster capable, then in FIG. 3D the server process 308 of the second server 104 detects that server 102 has resumed normal operation. The second server 104 then initiates unload of the application. When server 102 initially comes back "on-line," it attempts to load the cluster capable application, but cannot as a result of a software blocking mechanism in the Netframe cluster software. Because of conflicts, the cluster capable application cannot be loaded and executed from multiple servers in a network at the same time. Therefore, the first server 102 cannot load the cluster capable application until after the backup server 104 has unloaded it. In order to unload the application at the backup server 104, a user, through a software interface, must unload the cluster capable application from server 104 RAM, by executing a command line for unloading the cluster capable application. The Netframe cluster software may then update the databases 110 and 112 to make server 104 the backup server and server 102 the host and primary server. At this point, failback procedure is complete.

If the application is cluster aware, then the application which was written to take advantage of network cluster software will be able to handle the transition from secondary to primary server more smoothly and efficiently through function calls to Netframe Cluster software via an application programming interface (API).

When the first server 102 resumes normal operations, the cluster aware application is loaded into the first server 102. However, it is in a pause mode as a result of a built-in feature of cluster aware applications. Prior to allowing itself to execute, the cluster aware application checks for conflicts. The cluster aware application checks the database 110 with respect to the object which represents the cluster aware application and notes that server 102 is the primary server for the cluster aware application, but is not the host server. It further notes that the second server 104 is assigned as the host server. Therefore, the cluster aware application is aware that it is a primary server coming out of failure. The clustered application that has been loaded into the primary server memory will not be executed until it verifies that the backup server has unloaded the clustered application. The cluster aware application has thus effectively been paused.

After the first server 102, which is designated as the primary server of the cluster aware program, is repaired, or otherwise brought back "on-line," the second server 104, which is the designated backup server of the cluster aware application, detects that the first server 102 is once again operational. This detection mechanism is explained in further detail below with respect to FIG. 5. Upon detecting that the primary server 102 is once again operational, the cluster application running on the secondary server 104 initiates an automatic unloading protocol to unload itself from the secondary (backup) server 104. Once the cluster aware application in the backup server 104 has been unloaded from RAM, then the Netframe Cluster software updates the databases 110 and 112 such that the primary server 102 is once again the host. Subsequently, the cluster aware application in the primary server 102 detects that the primary server 102 is once again the host and therefore the backup server 104 has unloaded. The cluster aware application terminates its paused function and executes. The failback process is complete.

A comparison of the two descriptions of failback processes for cluster capable and cluster aware demonstrates that cluster aware applications benefit from intimate intercommunication with the network cluster software. When the Netframe Cluster software is able to interact with the application program to control the cluster processes, as is the case with cluster aware applications, the failback, as well as the failover, process occurs smoothly and efficiently with less delay when compared to similar processes for cluster capable applications. For cluster capable applications, there is usually no automatic unloading function. Therefore, the Netframe Cluster software must usually prompt a system operator or user to manually unload the application from the backup server. Meanwhile, the primary server 102 must usually wait until the unloading is complete. Additionally for cluster capable applications, the functionality of deleting and correcting the primary server from loading the application until the backup has unloaded, must typically be programmed in the network cluster software. This is a less efficient and less elegant way of implementing this function and furthermore, requires additional overhead in terms of processing time and system resource use.

Figure 4B:
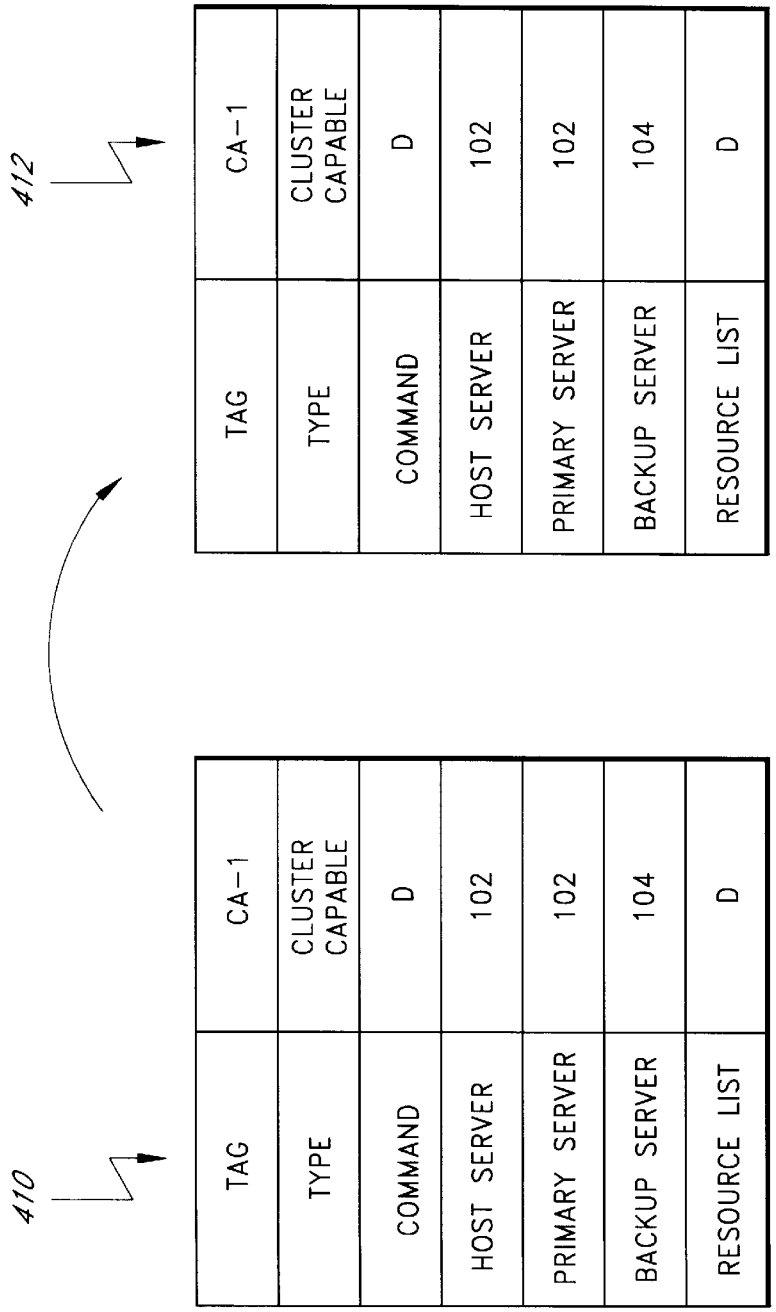
Figure 4C:
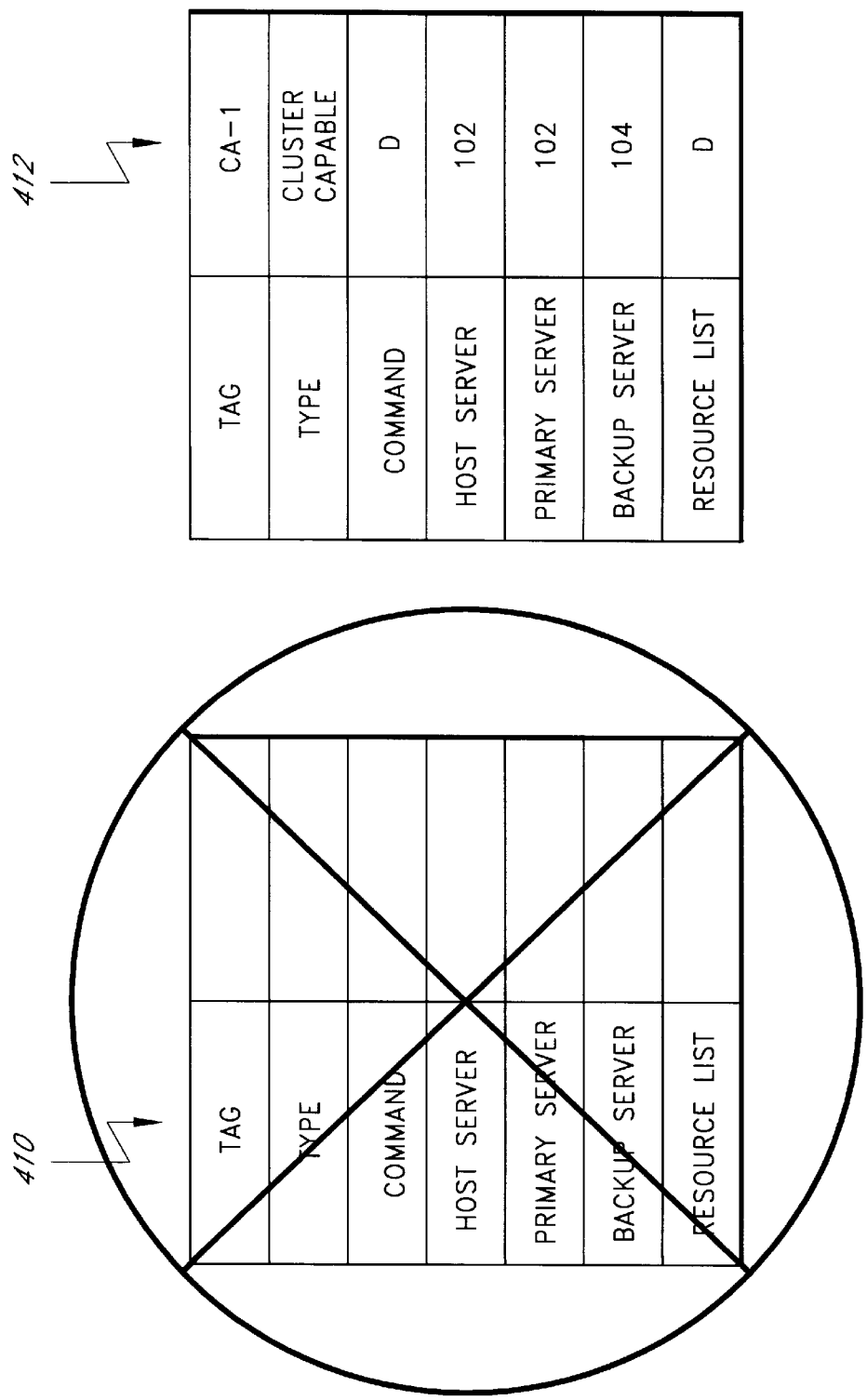
Figure 4D:
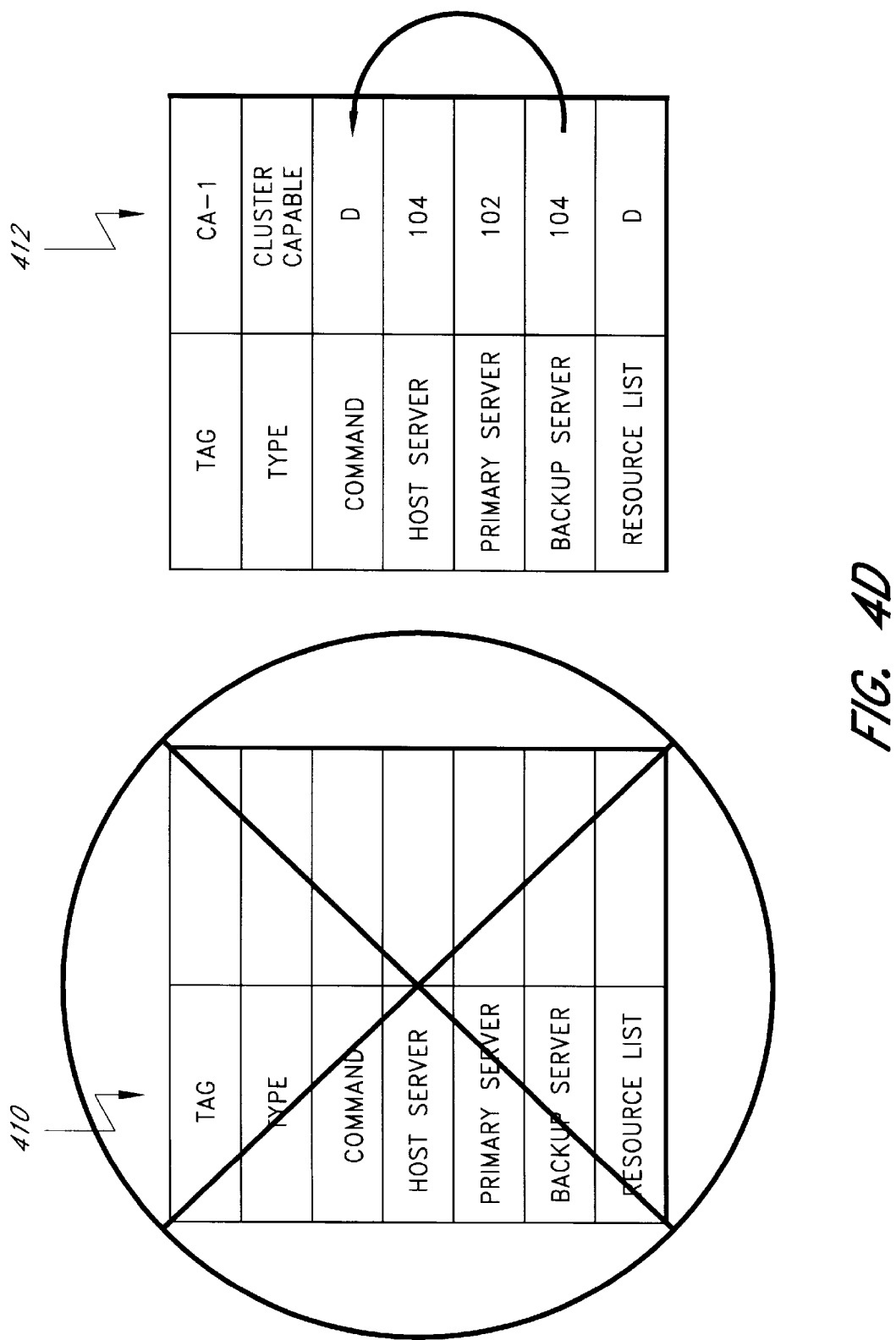
Figure 4E:
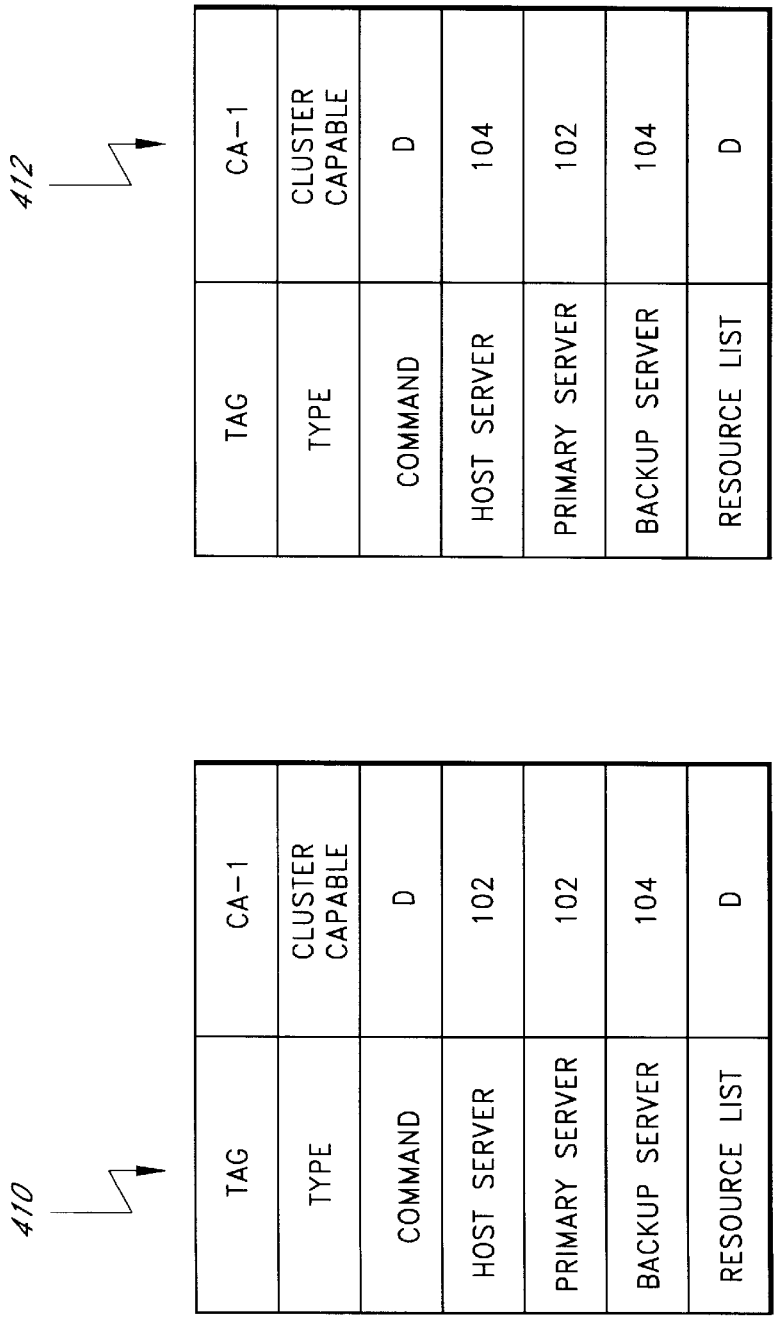
Figure 4H:
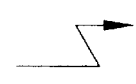
Figure 4H:
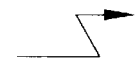

FIGS. 4A–H show objects 410 and 412 stored in the databases 110 and 112 of each server 102 and 104 for the sequence of detection, failover and failback for the execution of a cluster capable application. The objects 410 and 412 represent the cluster capable application as described above. A "D" means that there is an attribute value for a given attribute, but that it is not important to show its value for this discussion. FIG. 4A shows the objects 410 and 412 once the cluster capable application is loaded on the primary server 102, but before server resident processes 308 (FIGS. 3A–D) can update the database 112. FIG. 4B shows that the second database 112 has been updated to include an object representing the cluster capable application. FIG. 4C shows the objects 410 and 412 immediately after the primary server 102 has failed. Object 410 is crossed out to reflect that it is no longer available as a result of the primary server 102 failing. FIG. 4D shows the objects 410 and 412 after the backup server 104 loads the cluster capable application. Note that now server 104 is the host server. Immediately after the primary resumes normal operations, the primary server 102 recovers its object attribute values from immediately prior to server failure as shown in FIG. 4E. These attribute values are now out of date. Since object 412 is more up to date than object 410, the object 412 gets copied onto the object 410 as shown in FIG. 4F. Once the second server 104 detects that the primary server 102 has resumed normal operation, the server resident processes 310 at server 104 unload the cluster capable application and, thereafter, the primary loads it and update the attribute values as in FIG. 4G. Finally, as shown in FIG. 4H, the updated object 412 is copied to the less current object 410.

Figure 5:
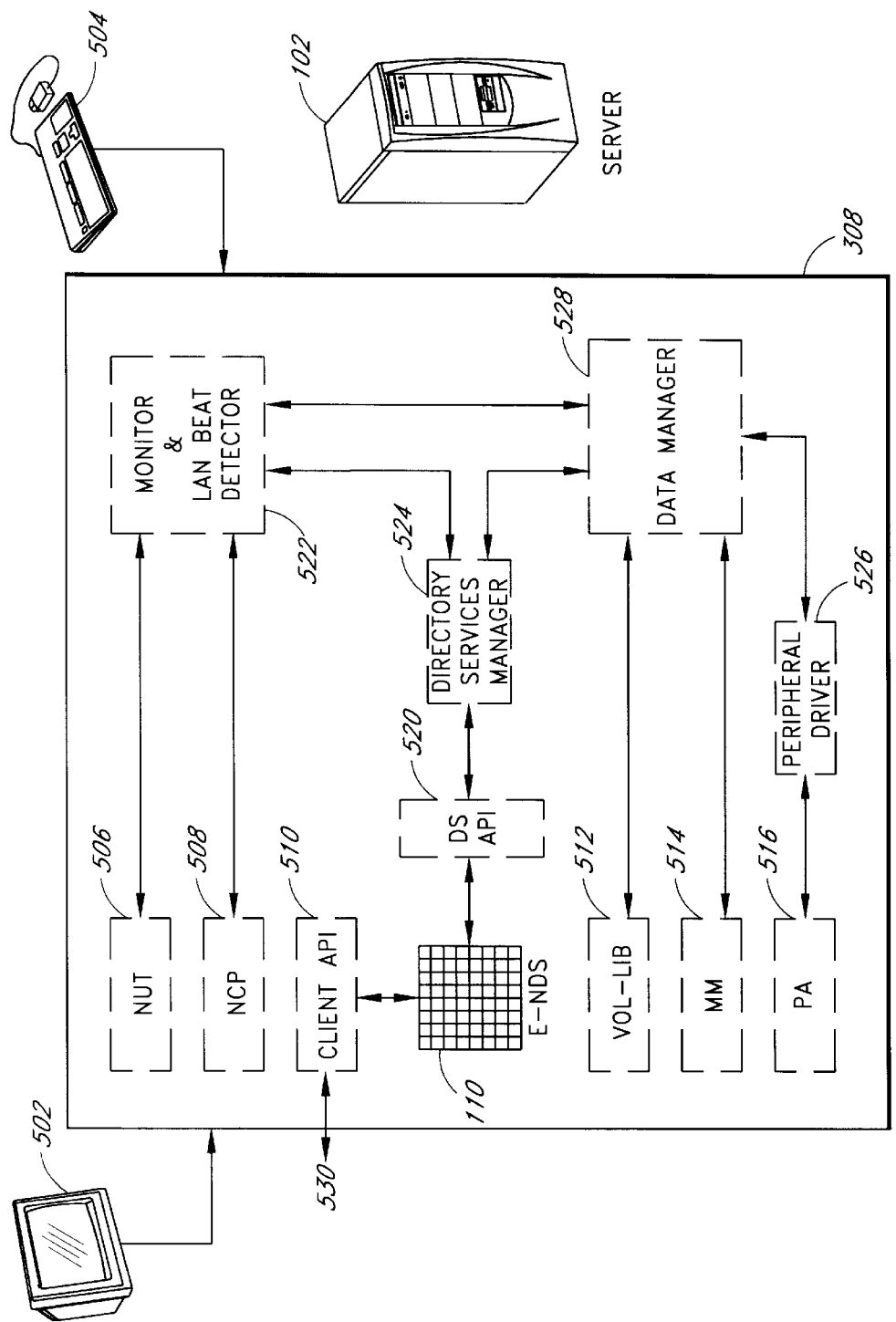
FIG. 5 is a functional block diagram showing some of the processing modules of a Netframe Cluster software program in accordance with one embodiment of the invention.

FIG. 5 is a block diagram of an embodiment of some basic modules of the Netframe Cluster software resident on the server 102 which collectively accomplish the server resident processes 308 associated with detection, failover and failback as well as other cluster functions. Similar modules exist on each server. A server input unit 504 and display 502 are shown. Modules 506–516 are currently provided with network utilities such as NetWare®4.x. These modules may interact with modules 520–528 in order to provide the resident processes 308 for detection, failover and failback. Module 506 may be a NetWare Loadable Module (NLM) which provides a graphical user interface in order to interact with NetWare®4.x and with the resident processes 308. Module 508 may be a communication module which provides connection oriented service between servers. A connection oriented service is one that utilizes an acknowledgment packet for each package sent. Module 510 may include client base applications which allow a workstation to communicate through interface port 530 directly with network software and the resident processes 308. Module 110 is the database 110 of FIG. 1 and is a replica of the enhanced network directory database which may include objects as described above. Module 512 is loadable and provides volume management services including scanning for, mounting and dismounting volumes. Module 514 is a media manager module which allows a server to obtain identification numbers for directly attached resources. Module 516 is a peripheral attachment module which allows the server to communicate with directly attached devices such as storage devices or printers. Module 520 provides an application programming interface (API) which allows additional attributes to be added to each object in the enhanced network directory database. This module also allows the attribute values for those additional attributes to be viewed, altered, or updated.

Modules 522–528 may interact with the above discussed modules to provide the server resident processes for detection, failover and failback. Module 522 may handle communications with a user through network user terminal module 506.

Module 522 may also be responsible for sending and receiving packets through NCP module 508 to manage failure detection and recovery detection of a primary server. Module 524, the directory services manager, may be responsible for communicating through module 520 with the enhanced network directory database 110. Module 524 controls the adding of attributes, and the viewing and editing of attribute values within that database. Module 526 is a device driver which in a current embodiment superimposes a phase shifted signal on the peripheral communications between a server and its direct connected resources to detect server failure. Module 526 sends and receives these phase shifted signals through module 516. Module 528 controls the overall interaction of modules 522–526. In addition, module 528 interfaces with module 512 to scan, mount and dismount objects or resources. Furthermore, module 528 interacts with module 514 to obtain device hardware identifiers for directly attached devices.

Additionally, through the API 520 the Netframe Cluster software can interact and communicate with additional functionality provided by cluster aware applications. Such functionality is provided by a resource module within the cluster aware application which contains a list of resources required to executed the application. Moreover, the resource module may create the RESOURCE LIST attribute in a corresponding object and store resource identifiers in the attribute value field by automatically writing to the object in the database. When a backup server detects a primary server failure, the Netframe Cluster software can be called to read the backup server's BIOS or configuration files in order to determine which resources are available on the backup server. By comparing a resource list stored in the object attribute RESOURCE with information contained in the backup system BIOS and/or start up configuration files, the cluster aware application can determine if the required resources are available.

In another embodiment, the cluster aware application may include an automatic registration module wherein, upon being loaded, the cluster aware application automatically determines if it has been previously registered and, if not, then creates an object, stores the object in the database and writes attribute values to the object. One embodiment of this process is described in further detail below with respect to FIG. 6. As used herein, the term "module" refers to any software, firmware or hardware, or any combination thereof which may be implemented to perform a specified function, process, procedure or protocol.

A further functionality that may be provided by cluster aware applications is that of "leaving a marker" to resume execution of the application where a previous server "left off" or ceased operations. A marker set module may be written into a cluster aware application which constantly updates a pointer as each line of code is executed, for example. The location of this pointer may be periodically written to an application specific interface (ASI) file located within the network directory database. When a backup server detects the failure of a primary server, the backup will launch the cluster aware application. Before executing, a marker-read module in the application reads the ASI file and obtains the pointer value. The application then proceeds to execute at a location in the program indicated by the pointer.

Figure 6:
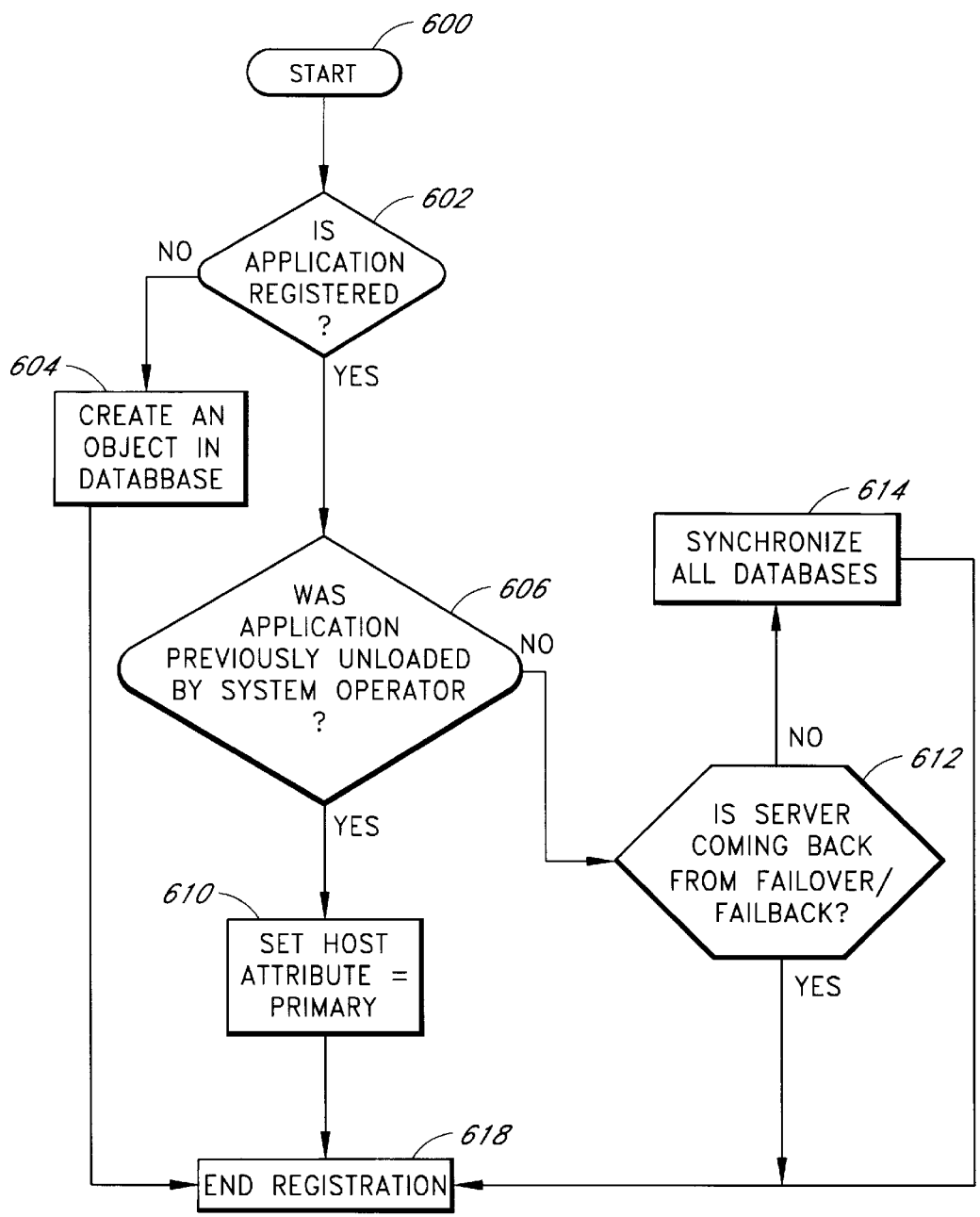
FIG. 6 is a flowchart diagram of a process of determining the registration status of a cluster application program and thereafter taking appropriate steps depending on the registration status, in accordance with the one embodiment of the invention.

Referring to FIG. 6, a flowchart diagram of one embodiment of a process of determining the registration status of an application loaded on a primary server is illustrated. The process begins at step 600, at which point the application program has been loaded into the RAM of a primary server, and proceeds to step 602. In step 602, the process queries whether the application has been previously registered. The process does this by scanning the database 110 (FIG. 2), which stores all objects registered in the database 110. During this scan it looks for an object with a TAG identifier which corresponds to the application program that has been loaded into the primary server, and a PRIMARY attribute value which matches the ID of the server on which the application program is loaded. If the application has been previously registered, an object with the above TAG and PRIMARY attribute values should exist. If it is determined in step 602 that the application is not registered, then in step 604 an object is created for the application and stored in the database. For cluster capable applications, objects are typically created manually by prompting a system operator to insert the various attribute values. However, for cluster aware programs, a registration module may be embedded in the program which automatically creates the object and writes attribute values to the object. This registration module is typically the first operation executed by the cluster aware application.

If in step 602, it is determined that the application is already registered, then in step 606, the process queries whether the application was previously unloaded by a system operator. When a registered application is loaded, there are three possible scenarios which have lead to this condition. The first is that a system operator had previously loaded and registered the application and voluntarily unloads the application (i.e., exits from the program). In this case, when the system operator manually unloads the application, Netframe Cluster software sets the HOST SERVER attribute within the object for the application to a value of null (0). The second scenario is that after the application was loaded and registered, the primary server failed and execution of the application resumed in a backup server. Upon coming back on line, otherwise known as "phoenixing," the primary server will once again load the program. The third is when both primary and backup have failed and are now recovering. These three scenarios should be distinguished because they require different types of updates to the object in the database. This distinction of the scenarios is carried out by step 606 by checking the HOST attribute value in the object.

If the application was previously manually unloaded by a system operator, the HOST attribute value will be null. If in step 606 it is determined that the preregistered application was previously manually unloaded by a system operator, the process moves to step 610 wherein the process resets the HOST attribute to equal the primary server ID value. The registration/status check process then ends at step 618 and execution of the application may proceed. If in step 606, it is determined that the application was not previously unloaded by a system operator, the process moves to step 612 in which the process queries whether the primary server is phoenixing. If the primary server is phoenixing, i.e., the primary is rebooting, the HOST attribute value will be set to a backup server ID value. In this state, for cluster aware applications, the application is loaded but in a pause mode, as described above. If the primary service is phoenixing, the process knows that the application is running on a backup server and, therefore, the primary must have previously failed and is now regaining control over the application from a backup. The execution of the application is commenced upon the backup server unloading its version of the application program, and the Netframe Cluster software updating the HOST attribute to indicate the primary once again.

However, if the HOST attribute is set to the primary server ID value, it is determined that there has been a simultaneous failure of the backup and primary servers (a rare occurrence). If in step 612, it is determined that the primary is undergoing the failover/failback process executed by Netframe Cluster software, then the registration/status check process ends at step 618. The failover/failback processes continue on their own accord and carry out the processes of updating the database and switching control over the application between a primary server and a secondary server, as described above. However, if in step 612, it is determined that the primary server is not in a failover/failback mode, the registration process determines that some type of major network failure has occurred, e.g., a power failure to all servers, and proceeds to step 614 in which it synchronizes all the replicated databases in the server network. The process then ends at step 618.

FIG. 7A shows the failure detection and failback portions of both the primary and backup processes. The processes for a server performing as a primary with respect to an object commence with splice block A. From splice block A control passes to process 800. In process 800 a drive pulse is asserted. The drive pulse is appropriate for those objects which are connected to the server by a bus, a Small Computer Storage Interconnect (SCSI) bus with multiple initiators, or any other means of connection. The drive pulse is asserted by the primary server across this connection. The pulse enables the secondary server to sense primary server failure, as will be discussed shortly in connection with processes 802–808. The primary server with respect to a storage device connected to both servers 102 and 104. When the resident processes on server 102 process an object in the enhanced network directory database corresponding to storage device, the primary server, server 102, transmits a drive pulse to the storage device. Control passes from process 800 directly to primary splice block C. In another embodiment, the detection mechanism may be implemented by transmitting SCSI RELEASE and RESERVE commands to an SCSI device from the primary server. The backup server may monitor the release and reserve status of the SCSI device in order to ascertain the operational status of the primary server. Referring again to FIG. 1, this "SCSI heartbeat" method is implemented by transmitting SCSI RESERVE and RELEASE commands to the SCSI device 118 via the SCSI bus 120. The secondary server 104 monitors the operational status of the first server 102 by transmitting SCSI Test Unit Ready signals to the SCSI device 118 and determining the reserve/release status of the SCSI device 117. A more detailed discussion of this "SCSI heartbeat" method of monitoring the operational status of the primary server is discussed in greater detail in a co-pending U.S. patent application entitled, "A Method and System For Communicating A Software-Generated Pulse Waveform Between Two Servers in a Network," which is listed in Appendix A attached hereto.

The processes run on the backup server in connection with failure-detection and fail-over are initiated at splice block B, which is shown on the right-hand side of FIG. 7A. Control passes from splice block B to processes 802–804. In process 802 the backup server continually monitors the LAN communication between itself and the primary server to determine when the primary server has failed. It does this by determining the primary server ID from the host server attribute value. This object attribute ID is appended by the LAN detector module 522 to network control protocol packets. These packets are sent intermittently by the network control protocol module 508 [see FIG. 5] on the backup server to the primary server to determine when the primary server fails. Concurrently, in process 804, the drive pulse is monitored. Control is then passed to decision process 806.

In decision process 806, a determination is made as to whether on the basis of LAN communications, the primary server has failed. In the event this determination is in the negative, control returns to processes 802 and 804. Alternately, if this determination is in the affirmative i.e., that the primary server is no longer responding to the secondary server's NCP packets, then control is passed to decision process 808. In decision process 806, a determination is made as to whether the drive pulse from the primary is still being received by the secondary server. If a determination is made that the communication between the primary server and the storage device has not failed, i.e., that the drive monitor is still detecting drive pulses from the primary, then control returns to processes 802 and 804. This secondary drive detection assures that a momentary LAN failure will not result in the determination that the primary server has failed when in fact that primary server still is communicating with the resource/object such as storage device. In the alternative, if determination is reached in decision process 808 that the primary server is no longer communicating with the resource/object, then control is passed to the process 810. In process 810 the user is notified of the failure of a primary server. The notification occurs through the cooperative operation of modules 528, 522 and 508 discussed above in connection with FIG. 5. Control is then passed to process 812. In process 812 the secondary server activates the object and passes control to process 814. In process 814 the secondary server mounts the object i.e., physically assumes control over the object. Control is then passed to process 816 in which the secondary server writes into the host server attribute the value for its ID in place of the primary server ID. This new attribute value is then replicated across all enhanced network directory databases on all the servers in the enterprise. Thus, a failure has been detected and transparently to the user an alternate path for communications between workstations and an object, e.g. a cluster capable application is established through the secondary server, e.g. server 102.

Figure 7B:
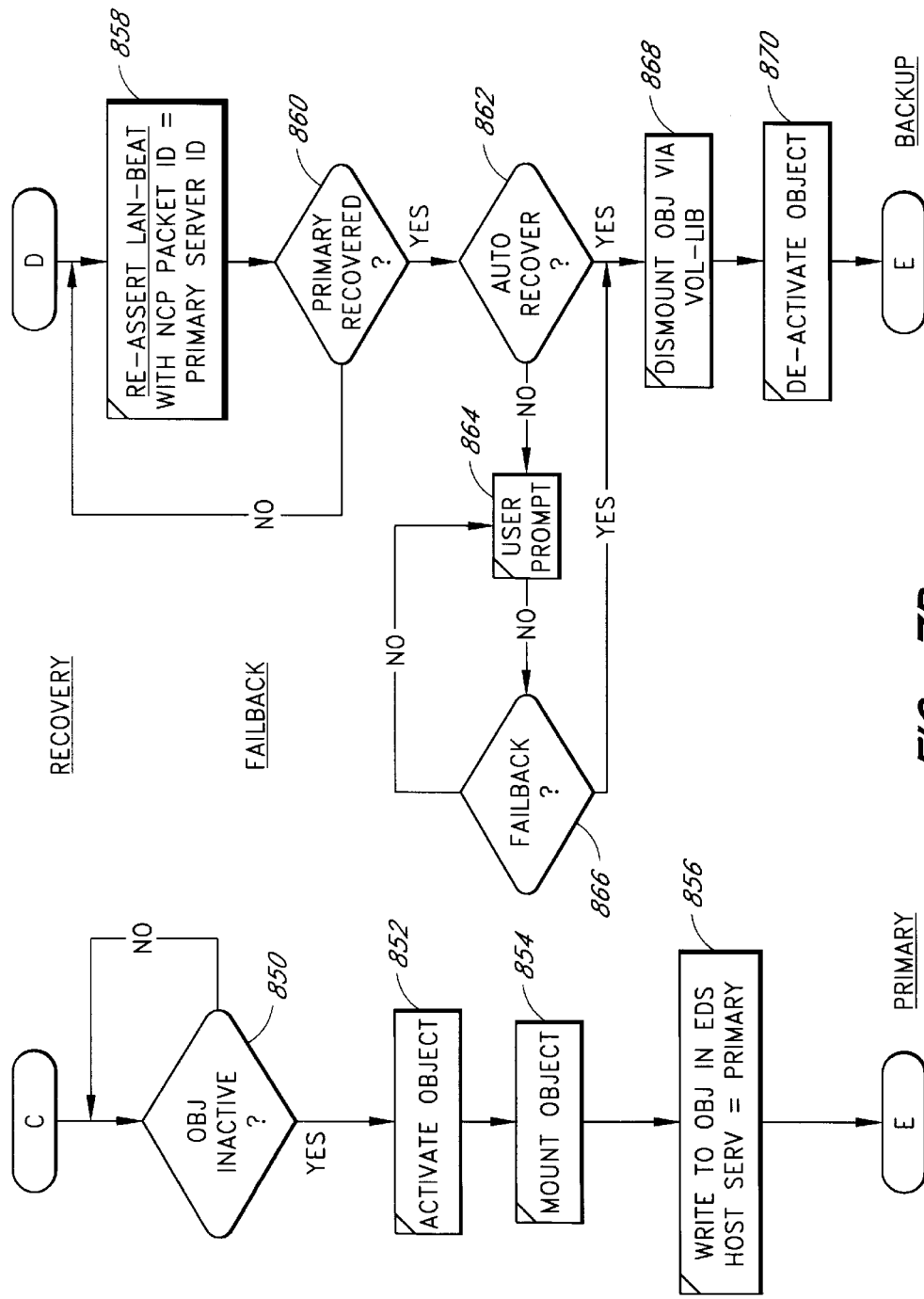
FIG. 7B illustrates a flowchart for one embodiment of a process of recovery detection and failback, in accordance with the invention.

FIG. 7B details the recovery and fail-back processes on the servers which have a primary and backup relationship with respect to a specific object being processed. The server which has a backup relationship initiates the recovery fail-back process at splice block D. Control then passes to process 858 in which the backup server initiates a LAN heartbeat to enable it to determine whether the primary server has resumed normal operation. This LAN beat was discussed above in connection with process 802 [see FIG. 7A]. Control is then passed to decision process 860. In decision process 860 a determination is made on the basis of the LAN beat as to whether or not the primary server has recovered. If this determination is in the negative, then control returns to process 858. Alternately, if the determination in made in the affirmative i.e., that the primary has recovered, then control passes to decision process 862.

In decision process 862, a determination is made as to whether the auto-recover attribute value 218A is enabled, i.e., boolean TRUE. In the event this determination is in the negative, then control is passed to process 864. In process 864, the user or network administrator is prompted with the news of a recovery and a request for direction as to whether to initiate failback. Control is then passed to decision process 866. In decision process 866 a determination is made as to whether the user response was in the affirmative. In the event that determination is in the negative, control returns to process 864. Alternately, if that determination is in the affirmative, i.e., the user has indicated that fail-back is appropriate, then control passes to process 868. Alternately, if in decision process 862 a determination is made in the affirmative, i.e., that auto-recovery has been enabled, then control also passes to process 868. In process 868, the backup server dismounts the object. An object dismount is accomplished by the backup server through the cooperative interaction of data manager module 528 and Vol-Lib module 512. [See FIG. 5] Control then passes to process 870. In process 870, the backup server deactivates the object. Control is then passed to splice block E in which the processing of the next object is initiated.

The processes for recovery and fail back as performed on a server designated as primary with respect to a specific object being processed commences at splice block C. Control then passes to decision block 850. In decision block 850, a determination is made as to whether the object has been inactivated. An object which has been de-activated on the backup server in process 870, will be detected by the primary server in decision process 850 to be inactive. In the event the determination in decision process 850 is in the negative, then control loops back to re-initiate that same decision process 850. Alternately, if a determination in the affirmative is reached, i.e., that the object has been de-activated, then control passes to process 852. In process 852, the object is activated by the primary server. Control then passes to process 854. In process 854, the object is mounted by the primary server. Control then passes to process 856. In process 856, the primary server modifies the host server attribute value with respect to that object and writes its own ID into the host server attribute value. Control is then passed to blocks A and B in which the processing of the next object is initiated.

Figure 8:
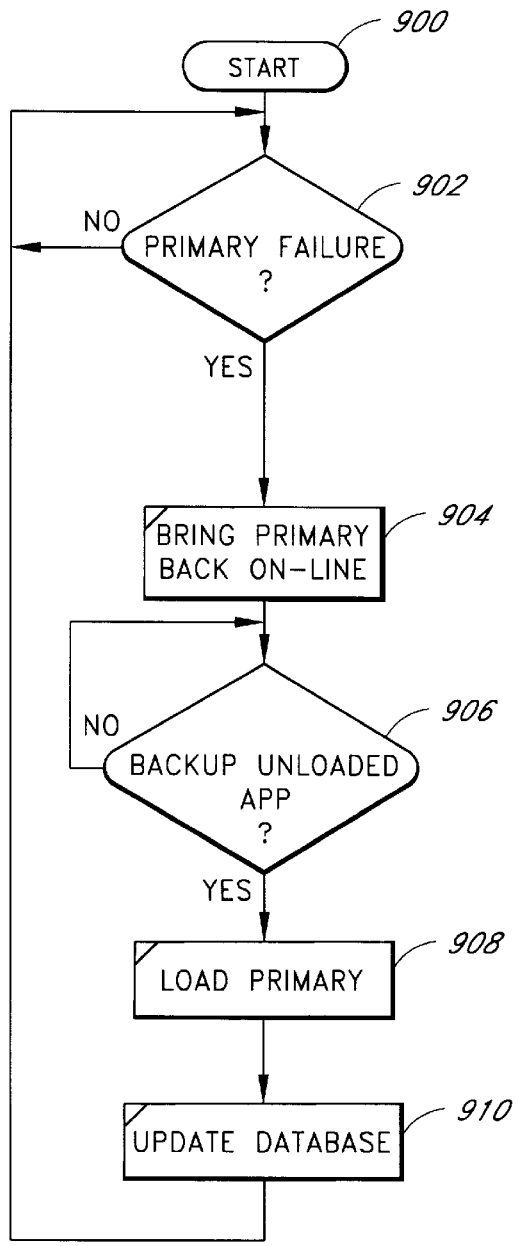
FIG. 8 illustrates a flowchart of one embodiment of a detection failover/failback process as seen by a primary server, in accordance with the invention.

Referring to FIG. 8 a flowchart diagram of one embodiment of a failover/failback process as seen by a primary server is illustrated. It is understood that the failover process includes actions by both the primary and backup servers and, similarly, the failback process includes actions by both the primary and backup servers. The following description discusses processes carried out at or by the primary server during an overall process of failure detection, failover and failback. The process starts at location 900. In step 902, a determination is made as to whether the primary server has failed. This is a separate enquiry from the one made by the backup server, as described above. In step 902, the determination is made from the perspective of a system operator or network administrator, who must be notified that the primary server is down in order to take remedial actions to fix the primary server. One embodiment of a method and system of such a failure reporting system is described in a co-pending and commonly owned U.S. patent application, entitled, "Method of Automatically Reporting A System Failure in a Server Network," which is listed in Appendix A attached hereto.

If in step 902 it is determined that the primary has not failed, the step recursively repeats itself. If it is determined that the primary server has failed, in step 904, a system operator who has been notified of the failure, as described above, repairs the failure and brings the primary server back on-line. Upon being operational again, a failback module queries whether the backup has unloaded its version of the application. This query is made by interrogating the object in the database and verifying that the HOST attribute has been set to the primary server ID once again. Upon verifying that the backup server has unloaded the application, in step 908 the process loads the application into the RAM of the primary and begins executing. In step 910, a replicated databus within the primary server is updated to reflect the change in HOST affiliations.

Figure 9:
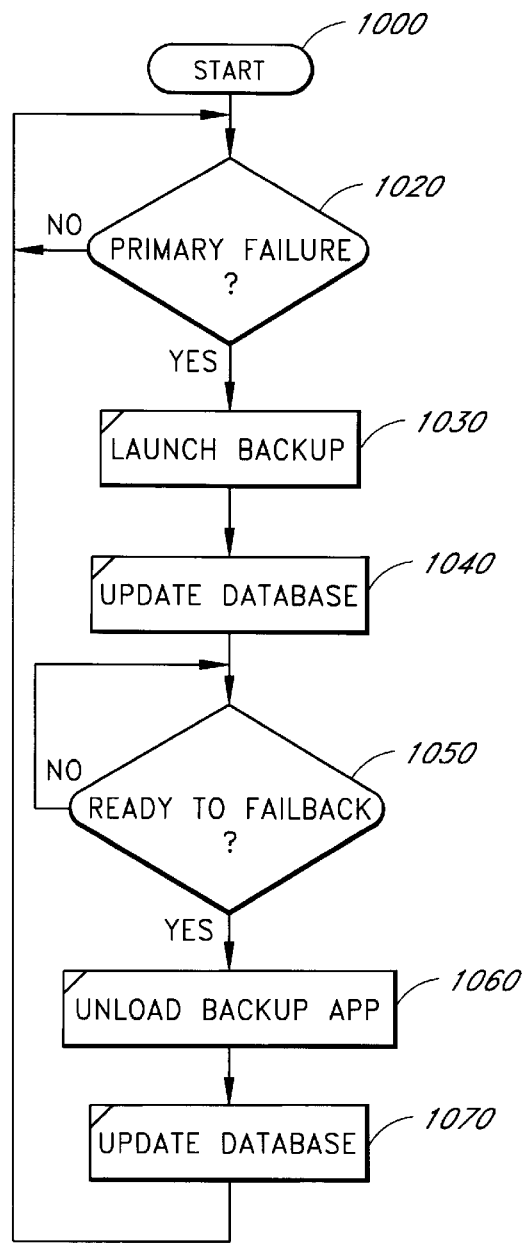
FIG. 9 illustrates a flowchart of one embodiment of a detection failover/failback process as seen by a backup server, in accordance with the invention.

Referring now to FIG. 9, a flowchart of the steps carried out by the backup server during a detect, failover and failback procedure executed by Netframe Cluster software is illustrated. The procedure starts at location 1000 and proceeds to step 1020 wherein the second server determines whether a primary server failure has been detected. The detection may be carried out by any one or combination of the detection methods discussed above, i.e., the LAN Heartbeat method and the Drive pulse method. In step 1020, the process keeps recursively monitoring for a primary server failure. If in step 1020 a primary server failure is detected, then in step 1030, the backup server loads and launches its version of the application program. The backup knows to execute the application because it knows that the primary has failed and therefore interrogates its replicated database to discover that an object corresponding to the application is in the active space of the directory which lists the primary server as the HOST and the backup as the BACKUP. After the backup has loaded and launched its version of the application program, in step 1040, Netframe Cluster software updates the database by changing the HOST attribute to indicate the backup server as the new host of the application. Therefore, all further access to the application by network clients/users will be through the backup server. In step 1050, the process queries whether the failback program, or module, should be initiated. The failback module is initiated when the primary server is back on-line. Therefore, part of the query of step 1050, is making a determination as to whether the primary is back on-line. This detection mechanism may be carried out as described above by sending NCP packets to primary server and waiting for an acknowledgment signal. If an acknowledgment signal is not returned within a specified period of time, it is determined that the primary server is still not operational.

If in step 1050, it is determined that the primary server is back on-line and the process is ready to enter the failback mode, then in step 1060, the backup server unloads the application. In step 1070, the Netframe Cluster software updates the database by changing the HOST attribute back to its original primary server ID value.

The foregoing description has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A method for fault tolerant execution of an application program in a server network having a first server and a second server, comprising:

executing, in the first server, the application program;

storing an object which represents the application program into a cluster network database, wherein the object contains information pertaining to the application program;

detecting a failure of the first server;

determining whether the second server has sufficient resources to execute the application program; and executing, in the second server, the application program upon detection of the failure of the first server, in accordance with said information in said object.

2. The method of claim 1 wherein the act of storing the object comprises:

promting a system operator for the information, wherein the information comprises:

a host server attribute which identifies which server is currently executing the program;

a primary server attribute which identifies which server is primarily responsible for executing the program; and a backup server attribute which identifies which server is a backup server for executing the program if the primary server experiences a failure.

3. The method of claim 2 wherein the information further comprises:

an identification field which identifies the program;

a program type field which indicates whether the program is cluster capable or cluster aware; and a command field which controls a protocol for loading the program and subsequently executing the program.

4. The method of claim 2 wherein the act of executing the program in the second server comprises:

reading the backup server attribute in the object with the second server;

determining whether the backup server attribute names the second server as the backup server;

if the backup server status names the second server as the backup server, loading the program in the second server.

5. The method of claim 4 further comprising changing the host server attribute to name the second server as the host server of the program.

6. The method of claim 5 further comprising:

detecting when the first server is once again operational; and resuming execution of the program in the first server upon detecting that the first server is once again operational.

7. The method of claim 6 wherein the act of detecting when the first server is once again operational, comprises:

tranmitting packets at periodic intervals from the second server to the first server; and waiting for an acknowledgement signal in response to each packet for a specified period of time, wherein if the acknowledgement signal is received within the specified period of time, the first server is determined to be operational.

8. The method of claim 7 further comprising changing the host server attribute to name the first server as the host server of the program.

9. The method of claim 8 wherein the step of resuming execution of the program in the first server comprises:

unloading the program from a random access memory in the second server;

verifying that the program has been unloaded from the second server; and loading the program in a random access memory in the first server after the program has been unloaded from the second server.

10. The method of claim 9 wherein the act of verifying that the program has been unloaded from the second server comprises reading the host server attribute and determining that the host server status indicates the first server as the host server of the program.

11. The method of claim 1 wherein the act of detecting a failure of the first server comprises:

tranmitting packets at periodic intervals from the second server to the first server; and waiting for an acknowledgement packet in response to each packet for a specified period of time, wherein if the acknowledgement packet is not received within the specified period of time, the failure of the first server is detected.

12. The method of claim 1 wherein the act of detecting a failure of the first server comprises:

monitoring communications between the first server and a network resource; and detecting a termination in the communication between the first server and the network resource.

13. The method of claim 1 wherein the act of detecting a failure of the first server comprises:

successively transmitting first and second command signals from the first server to a device coupled to the first server, wherein the first command signal places the device in a first status condition and the second command signal places the device in a second status condition; and monitoring a status condition of the device with the second server, coupled to the device, wherein a change in the status condition of the device indicates that the first server is operational and a constant status condition indicates the failure of the first server.

14. The method of claim 1 further comprising:

detecting when the first server is once again operational; and resuming execution of the program in the first server upon detecting that the first server is once again operational.

15. The method of claim 14 wherein the act of detecting when the first server is once again operational, comprises:

tranmitting packets at periodic intervals from the second server to the first server; and waiting for an acknowledgement signal in response to each packet for a specified period of time, wherein if the acknowledgement signal is received within the specified period of time, the first server is determined to be operational.

16. The method of claim 14 wherein the step of resuming execution of the program in the first server comprises:

unloading the program from a random access memory in the second server;

verifying that the program has been unloaded from the second server; and loading the program in a random access memory in the first server after the program has been unloaded from the second server.

17. The method of claim 1 wherein the act of storing an object which represents the program in a cluster network database is performed automatically by the program as it is executed in the first server, wherein the information is contained within the program and is automatically written into the object stored the cluster network database.

18. The method of claim 17 wherein the information comprises:

a host server attribute which identifies which server is currently executing the program;

a primary server attribute which identifies which server is primarily responsible for executing the program; and a backup server attribute which identifies which server is a backup server for executing the program if the primary server experiences a failure.

19. The method of claim 18 wherein the information further comprises:

an identification field which identifies the program;

a program type field which indicates whether the program is cluster capable or cluster aware; and a command field which controls a protocol for loading the program and subsequently executing the program.

20. The method of claim 18 wherein the act of executing the program in the second server comprises:

reading the backup server attribute in the object with the second server;

determining whether the backup server attribute names the second server as the backup server;

if the backup server status names the second server as the backup server, loading the program in the second server.

21. The method of claim 20 further comprising changing the host server attribute to name the second server as the host server of the program.

22. The method of claim 21 further comprising:

detecting when the first server is once again operational; and resuming execution of the program in the first server upon detecting that the first server is once again operational.

23. The method of claim 22 wherein:

the act of executing the program in the second server comprises:

determining a first location within the program where execution of the program by the first server ceased; and commencing execution of the program by the second server at the first location; and the act of resuming execution of the program by the first server comprises:

determining a second location within the program where execution of the program by the second server ceased; and commencing execution of the program by the first server at the second location.

24. The method of claim 23 wherein:

the act of determining the first position comprises:

updating a pointer within the program as it is executed by the first server; and determining the location of the pointer prior to execution of the program by the second server; and the act of determining the second position comprises:

updating the pointer within the program as it is executed by the second server; and determining the location of the pointer prior to resuming execution of the program by the first server.

25. The method of claim 24 further comprising:

determining if the second server has access to specified resources necessary to execute the program; and if it is determined that the second server does not have access to the specified resources, sending an error message to a system operator.

26. The method of claim 25 wherein the specified resources are identified in a list of resources which is part of the information contained within the object.

27. The method of claim 26 wherein the act of determining if the second server has access to specified resources necessary to execute the program, comprises comparing the list of resources to a list of resources initialized by a BIOS program stored within the second server.

28. The method of claim 26 wherein the act of determining if the second server has access to specified resources necessary to execute the program, comprises comparing the list of resources to a configuration file stored within the second server.

29. The method of claim 21 wherein the act of detecting when the first server is once again operational, comprises:

tranmitting packets at periodic intervals from the second server to the first server; and waiting for an acknowledgement signal in response to each packet for a specified period of time, wherein if the acknowledgement signal is received within the specified period of time, the first server is determined to be operational.

30. The method of claim 29 further comprising changing the host server attribute to name the first server as the host server of the program.

31. The method of claim 30 wherein the step of resuming execution of the program in the first server comprises:

unloading the program from a random access memory in the second server;

loading the program in a random access memory in the first server;

pausing execution of the program in the first server until it is verified that the program has been unloaded from the second server; and verifying that the program has been unloaded from the second server.

32. The method of claim 31 wherein the acts of pausing, verifying and commencing are automatically performed by executing commands stored within the program.

33. The method of claim 32 wherein the act of verifying that the program has been unloaded from the second server comprises reading the host server attribute and determining that the host server status indicates the first server as the host server of the program.

34. The method of claim 18 wherein the act of executing the program in the second server comprises:
    determining a first location within the program where execution of the program by the first server ceased; and
    commencing execution of the program by the second server at the first location.

35. The method of claim 34 wherein the act of determining the first position comprises:
    updating a pointer within the program as it is executed by the first server; and
    determining the location of the pointer prior to execution of the program by the second server.

36. The method of claim 18 further comprising:
    if it is determined that the second server does not have the specified resources, sending an error message to a system operator.

37. The method of claim 36 wherein the specified resources are identified in a list of resources which is part of the information contained within the object.

38. The method of claim 37 wherein the act of determining if the second server has access to specified resources necessary to execute the program, comprises comparing the list of resources to a list of resources initialized by a BIOS program stored within the second server.

39. The method of claim 37 wherein the act of determining if the second server has access to specified resources necessary to execute the program, comprises comparing the list of resources to a configuration file stored within the second server.

40. The method of claim 18 further comprising:
    detecting when the first server is once again operational; and
    resuming execution of the program in the first server upon detecting that the first server is once again operational.

41. The method of claim 40 wherein the act of detecting when the first server is once again operational, comprises:
    tranmitting packets at periodic intervals from the second server to the first server; and
    waiting for an acknowledgement signal in response to each packet for a specified period of time, wherein if the acknowledgement signal is received within the specified period of time, the first server is determined to be operational.

42. The method of claim 17 wherein the act of detecting a failure of the first server comprises:
    tranmitting packets at periodic intervals from the second server to the first server; and
    waiting for an acknowledgement signal in response to each packet for a specified period of time, wherein if the acknowledgement signal is not received within the specified period of time, the failure of the first server is detected.

43. The method of claim 17 wherein the act of detecting a failure of the first server comprises:
    monitoring communications between the first server and a network resource; and
    detecting a termination in the communication between the first server and the network resource.

44. The method of claim 17 wherein the act of detecting a failure of the first server comprises:
    successively transmitting first and second command signals from the first server to a device coupled to the first server, wherein the first command signal places the device in a first status condition and the second command signal places the device in a second status condition; and
    monitoring a status condition of the device with the second server, coupled to the device, wherein a change in the status condition of the device indicates that the first server is operational and a constant status condition indicates the failure of the first server.

45. A method for fault tolerant execution of an application program in a server network having a first server and a second server, comprising:
    executing, in the first server, the application program;
    prompting a system operator for information to be stored in a cluster network database, wherein the information comprises:
        a host server attribute which identifies which server is currently executing the program;
        a primary server attribute which identifies which server is primarily responsible for executing the program; and
        a backup server attribute which identifies which server is a backup server for executing the program if the primary server experiences a failure;
    determining if the first server has failed;
    if it is determined that the first server has failed, initiating a failover procedure, comprising:
        reading the backup server attribute in the object with the second server;
        determining whether the backup server attribute names the second server as the backup server;
        determining whether the second server has sufficient resources to execute the application program;
        if the backup server status names the second server as the backup server, loading the program in the second server and determining if the first server is once again operational; and
    if it is determined that the first server is once again operational, initiating a failback process, comprising:
        unloading the program from a random access memory in the second server;
        verifying that the program has been unloaded from the second server; and
        loading the program in a random access memory in the first server after the program has been unloaded from the second server.

46. A method for fault tolerant execution of an application program in a server network having a first server and a second server, comprising:
    executing the application program in the first server;
    automatically storing an object in a cluster network database, wherein the object represents the program and contains information comprising:
        a host server attribute which identifies which server is currently executing the program;
        a primary server attribute which identifies which server is primarily responsible for executing the program; and
        a backup server attribute which identifies which server is a backup server for executing the program if the primary server experiences a failure;
    determining if the first server has failed;
    if it is determined that the first server has failed, initiating a failover procedure, comprising:
        determining whether the second server has sufficient resources to execute the application program;
        reading the backup server attribute in the object with the second server;
        determining whether the backup server attribute names the second server as the backup server;
        if the backup server status names the second server as the backup server, loading the program in the second server;

executing the program in the second server;

determining if the first server is once again operational; and if it is determined that the first server is once again operational, initiating a failback process, comprising:
unloading the program from a random access memory in the second server;
loading the program in a random access memory in the first server;
pausing execution of the program in the first server until it is verified that the program has been unloaded from the second server; and
verifying that the program has been unloaded from the second server.

47. The method of claim 46 wherein the act of storing an object which represents the program in a cluster network database is performed automatically by the program as it is executed in the first server, wherein the information is contained within the program and is automatically written into the object stored the cluster network database.

48. The method of claim 46 wherein the acts of pausing, verifying and commencing are automatically performed by executing commands stored within the program.

49. The method of claim 46 wherein:

the act of executing the program in the second server comprises:
determining a first location within the program where execution of the program by the first server ceased; and
commencing execution of the program by the second server at the first location; and the act of executing the program by the first server after it is verified that the program has been unloaded from the second server, comprises:
determining a second location within the program where execution of the program by the second server ceased; and
commencing execution of the program by the first server at the second location.

50. The method of claim 49 wherein:

the act of determining the first position comprises:
updating a pointer within the program as it is executed by the first server; and
determining the location of the pointer prior to execution of the program by the second server; and the act of determining the second position comprises:
updating the pointer within the program as it is executed by the second server; and
determining the location of the pointer prior to resuming execution of the program by the first server.

51. The method of claim 46 further comprising:

determining if the second server has access to specified resources necessary to execute the program; and if it is determined that the second server does not have access to the specified resources, sending an error message to a system operator.

52. The method of claim 51 wherein the specified resources are identified in a list of resources which is part of the information contained within the object.

53. The method of claim 52 wherein the act of determining if the second server has access to specified resources necessary to execute the program, comprises comparing the list of resources to a list of resources initialized by a BIOS program stored within the second server.

54. The method of claim 52 wherein the act of determining if the second server has access to specified resources necessary to execute the program, comprises comparing the list of resources to a configuration file stored within the second server.

55. A method for fault tolerant execution of an application program in a server network having a first and second server, comprising:

executing the application program in the first server;

storing an object which represents the program in a cluster network database, wherein the object contains information pertaining to the program;

detecting a failure of the first server;

reading the information contained in the object; and executing the application program in the second server upon detection of the failure of the first server, in accordance with the information in the object.

56. The method of claim 55 wherein the act of storing an object comprises:

storing a host server attribute which identifies which server is currently executing the program;

a primary server attribute which identifies which server is primarily responsible for executing the program; and a backup server attribute which identifies which server is a backup server for executing the program if the primary server experiences a failure.

57. A method of providing fault tolerant execution of an application program in a server network having a first server and a second server, comprising:

executing, in said first server, said application program;

detecting a failure of said first server to properly run said application; and automatically, without operator intervention, executing in said second server said application program in response to said detecting step upon determining that said second server has sufficient resources to execute the application program.

58. The method of claim 57 further comprising:

sensing correction of said failure of said first server; and automatically, without operator intervention, executing said application program in said first server in response to said sensing step.

59. The method of claim 58 wherein said sensing is provided by said second server.

60. The method of claim 57 wherein said detecting is provided by said second server.

61. A method of providing fault tolerant execution of an application program in a server network having a first and second servers, comprising:

executing, in said first server, said application program;

detecting a fault in the first server; and automatically, without operator intervention, executing, in said second server, said application program in response to said detecting step upon determining that the second server has sufficient resources to execute the application program.

62. The method of claim 61 further comprising:

sensing correction of said fault in said first server; and automatically, without operator intervention, executing said application program in said first server in response to said sensing step.

63. The method of claim 62 wherein said sensing is provided by said second server.

64. The method of claim 61 wherein said detecting is provided by said second server.

* * * * *

UNITED STATES PATENT AND TRADEMARK OFFICE
CERTIFICATE OF CORRECTION

PATENT NO.    : 6,134,673
DATED         : October 17, 2000
INVENTOR(S)   : Michael Chrabaszcz It is certified that error appears in the above-identified patent and that said Letters Patent is hereby corrected as shown below:

Column 1,
Lines 21 and 33, please remove the word "Softare" and replace therefor -- Software --.

Column 17,
Line 38, please remove the word "promting" and replace therefor -- prompting --.

Column 18,
Lines 9 and 34, please remove the word "tranmitting" and replace therefor
-- transmitting --.

Column 19,
Line 3, please remove the word "tranmitting" and replace therefor -- transmitting --.

Column 20,
Line 41, please remove the word "tranmitting" and replace therefor -- transmitting --.

Column 21,
Lines 39 and 48, please remove the word "tranmitting" and replace therefor
-- transmitting --.

Signed and Sealed this

Twenty-sixth Day of July, 2005

JON W. DUDAS
*Director of the United States Patent and Trademark Office*